US009586315B2

(12) United States Patent
Guerin et al.

(10) Patent No.: US 9,586,315 B2
(45) Date of Patent: Mar. 7, 2017

(54) SYSTEM AND METHOD FOR FLEXIBLE HUMAN-MACHINE COLLABORATION

(71) Applicant: THE JOHNS HOPKINS UNIVERSITY, Baltimore, MD (US)

(72) Inventors: Kelleher Guerin, Baltimore, MD (US); Gregory D. Hager, Baltimore, MD (US); Sebastian Riedel, Bayem (DE)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 15/001,003

(22) Filed: Jan. 19, 2016

(65) Prior Publication Data
US 2016/0129590 A1 May 12, 2016

Related U.S. Application Data

(63) Continuation of application No. 14/475,184, filed on Sep. 2, 2014, now Pat. No. 9,272,418.

(51) Int. Cl.
G06F 19/00 (2011.01)
G05B 19/04 (2006.01)
(Continued)

(52) U.S. Cl.
CPC ............ B25J 9/1628 (2013.01); B25J 9/163 (2013.01); B25J 9/1664 (2013.01); B25J 13/00 (2013.01);
(Continued)

(58) Field of Classification Search
None
See application file for complete search history.

(56) References Cited

U.S. PATENT DOCUMENTS 9,272,418 B1 *  3/2016  Guerin ................. B25J 9/1664
2003/0018401 A1  1/2003  Sorkin
(Continued)

FOREIGN PATENT DOCUMENTS

JP  2000-006068 A  11/2000

OTHER PUBLICATIONS

International Search Report and Written Opinion dated Nov. 3, 2015 from International Application No. PCT/US2015/047394, pp. 1-10.

Primary Examiner — Bhavesh V Amin
(74) Attorney, Agent, or Firm — MH2 Technology Law Group LLP

(57) ABSTRACT

Methods and systems for enabling human-machine collaborations include a generalizable framework that supports dynamic adaptation and reuse of robotic capability representations and human-machine collaborative behaviors. Specifically, a method of enabling user-robot collaboration includes providing a composition of a robot capability that models a robot's functionality for performing a type of task action and user interaction capabilities; specializing the robot capability with an information kernel to provide a specialized robot capability, the information kernel encapsulating a set of task-related parameters associated with the type of task action; providing an instance of the specialized robot capability as a robot capability element that controls the robot's functionality based on the set of task-related parameters; providing instances of the user interaction capabilities as interaction capability elements; executing the robot capability element to receive user input via the user interaction capability elements; and controlling, based on the user input and the set of task-related parameters, the robot's functionality to perform a task action of the type of task action in collaboration with the user input.

20 Claims, 9 Drawing Sheets

(51) Int. Cl.
*B25J 9/16* (2006.01)
*B25J 13/00* (2006.01)

(52) U.S. Cl.
CPC .............. *G05B 2219/33051* (2013.01); *G05B 2219/36422* (2013.01); *G05B 2219/40391* (2013.01); *Y10S 901/02* (2013.01); *Y10S 901/04* (2013.01); *Y10S 901/46* (2013.01)

(56) References Cited

U.S. PATENT DOCUMENTS

| | | |
|---|---|---|
| 2006/0161300 A1 | 7/2006 | Gonzalez-Banos et al. |
| 2012/0016671 A1 | 1/2012 | Jaggi et al. |
| 2013/0218340 A1 | 8/2013 | Hager et al. |

* cited by examiner

```
                               400
410      behavior_assist_teleop:     <- Behavior Name
420a     elements:                   <- Capability Elements
           - device_merlin_robot
           - ui_spacenav
    425a   - ui_pedal
           - module_assist_teleop
           - module_rviz
420b     gui_required:               <- Interface Modules
           - gui_tool_manager
    425b   - gui_assist_teleop
           - gui_panel: robot
420c     links:                      <- Behavior Links
           - device/merlin > ui/rviz: joint_state
    425c   - ui/spacenav > logic/assist_teleop: twist
           - logic/assist_teleop > device/merlin: pose
           - ui/pedal > logic/assist_teleop: left >> enable
```

FIG. 4

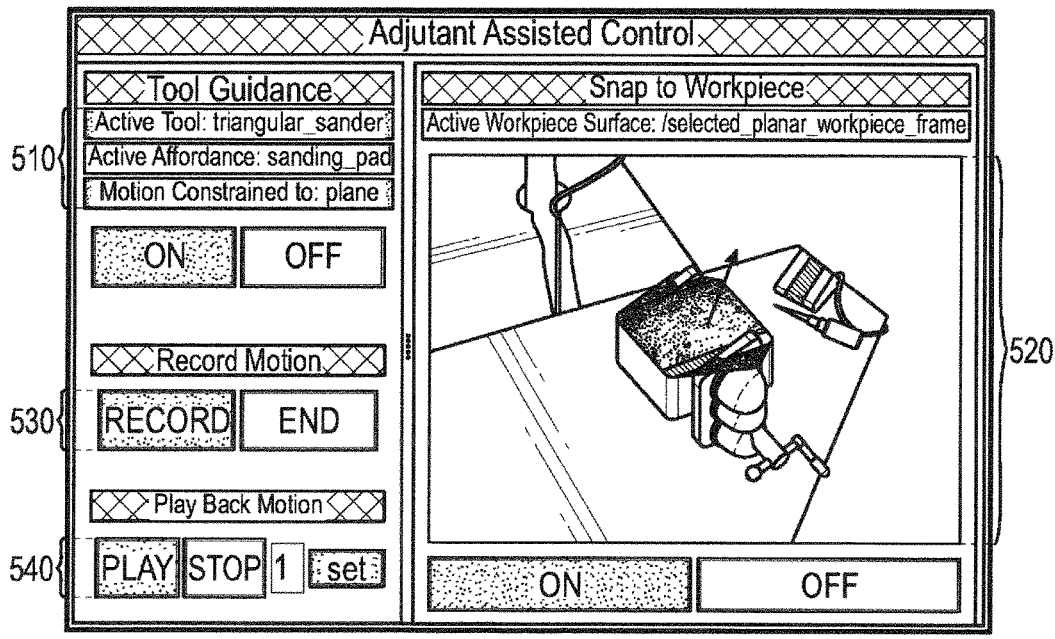

FIG. 5

SYSTEM AND METHOD FOR FLEXIBLE HUMAN-MACHINE COLLABORATION

CROSS-REFERENCE TO RELATED APPLICATIONS

The present Application for Patent is a continuation of and claims the benefit of U.S. patent application Ser. No. 14/475,184, filed Sep. 2, 2014, entitled "System and Method for Flexible Human-Machine Collaboration," which was allowed Sep. 25, 2015, and assigned or under obligation of assignment to the same entity as this Application and which is hereby expressly incorporated by reference in its entirety.

GOVERNMENT SUPPORT STATEMENT

This invention was made with Government support under Grant No. NRI-1227277 awarded by the National Science Foundation. The U.S. Government has certain rights in this invention.

FIELD

The present disclosure relates generally to systems and methods for enabling human-machine collaborations via a generalizable framework that supports dynamic adaptation and reuse of robotic capability representations and human-machine collaborative behaviors.

BACKGROUND

Robotic industrial automation has seen significant success in large-scale manufacturing because it offers significant advantages at scale for tasks such as welding, cutting, stamping, painting, heavy material handling, precision material machining, etc. The success of robotic automation in large-scale manufacturing has led to a long-standing desire to extend the use of robotic automation into small and medium-sized manufacturing enterprises ("SMEs"). However, in contrast to large scale manufacturing, SMEs' production processes are typically characterized by small production volumes and/or high product variability. Consequently, the ability to amortize the infrastructure, specialized personnel, setup, and programming of flexible robotic automation is far reduced for SMEs.

SME processes sometimes include tasks that require a high level of customization and therefore necessarily involve human skill and judgment. For example, refurbishment tasks and build-to-order manufacturing processes must accommodate unforeseen workpiece variances and equipment modifications. In such cases, an existing human-centered production process may find it difficult to determine where or how robotic automation can be a useful addition to an effective human-intensive process, rather than a duplication or attenuation thereof. Take, for instance, an SME specializing in custom furniture manufacturing that has a number of highly-skilled employees. That SME may want to improve the efficiency and productivity of its employees by using robotic systems to automate repetitive tasks that involve dexterous actions, such as drilling or sanding tasks. However, a commercial off-the-shelf robotic system would not be useful in this case because it would be impossible for the SME to leverage its employees' existing task knowledge and experience.

There is therefore a need for systems and methods for overcoming these and other problems presented by the prior art.

SUMMARY

Many task domains have yet to take advantage of automated robotic systems because of a lack of suitable collaborative systems that provide flexible and efficient interaction with such robotic systems. Examples of such task domains include SME processes, in-home assistance for physically disabled individuals, collaborative robotic surgery, etc. In these task domains, either performing a task manually or completely automating a task is neither desirable nor practical. Therefore, a need exists for collaborative robotic systems and methods that provide flexible and efficient user-robot interactions and are effective across a wide range of tasks with varying duration, complexity, and constraints on user interaction.

An exemplary collaborative robotic system according to various embodiments can be instructed or trained in a generalizable way to perform a wide range of tasks and be able to switch between tasks gracefully without retraining. The collaborative robotic system supports human-robot collaborative operations for ranges of user roles and robot capabilities, and models human-robot systems via sets of robot capabilities and collaborative behaviors that relate the robot capabilities to specific user interaction capabilities, which are user interfaces or interaction paradigms. A robot capability can be composited with other robot capabilities and specialized for specific tasks. To perform tasks, the collaborative robotic system can dynamically adapt robot capabilities using various task-related information or parameters, such as tool affordances or tool behavior constraints, tool movement primitives, and perceptual grounding templates. For a specific task and robot capability, the collaborative robotic system must determine one or more user interaction modalities required by the robot capability to accomplish the task, subject to the constraints of available interfaces. Therefore, a collaborative behavior, which includes a composition of one or more robot capabilities and one or more user interaction capabilities, must map the user interaction capabilities to the robot capabilities to meet the robot capabilities' requirements for user interaction.

Embodiments of the present disclosure relate to systems and methods for enabling human-machine collaborations via a generalizable framework that supports dynamic adaptation and reuse of robotic capability representations and human-machine collaborative behaviors. Specifically, a computer-implemented method of enabling user-robot collaboration includes providing a composition of a robot capability that models a robot's functionality for performing a type of task action and user interaction capabilities; specializing the robot capability with an information kernel to provide a specialized robot capability, the information kernel encapsulating a set of task-related parameters associated with the type of task action; providing an instance of the specialized robot capability as a robot capability element that controls the robot's functionality based on the set of task-related parameters; providing instances of the user interaction capabilities as interaction capability elements; executing the robot capability element to receive user input via the user interaction capability elements; and controlling, based on the user input and the set of task-related parameters, the robot's functionality to perform a task action of the type of task action in collaboration with the user input.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

FIG. 4 illustrates an example of a behavior manifest that specifies behavior components required by a collaborative behavior, consistent with the principles of the present disclosure.

FIG. 5 illustrates an example of user interfaces provided by the human-machine collaborative system, consistent with the principles of the present disclosure.

DETAILED DESCRIPTION

Figure 1A:
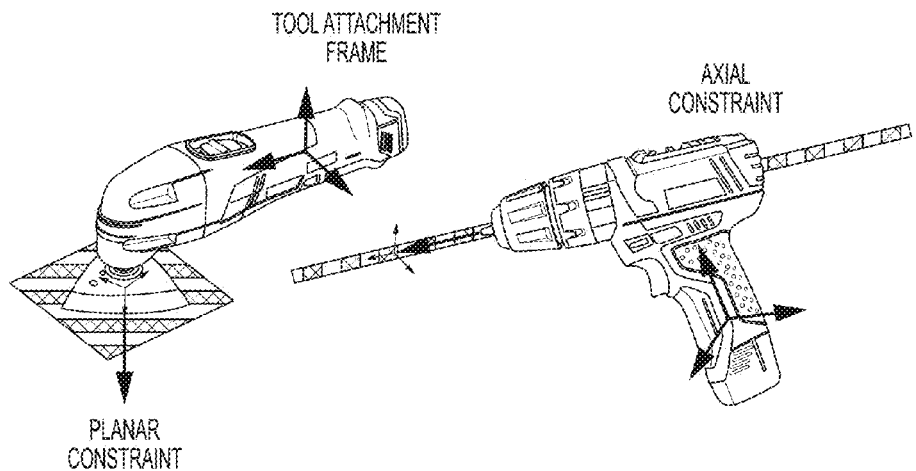
FIG. 1A is diagram illustrating examples of various types of tool behavior constraint associated with various types of tool, consistent with embodiments of the present disclosure.

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary embodiments. Electrical, mechanical, logical and structural changes may be made to the exemplary embodiments without departing from the spirit and scope of the present disclosure. The following detailed description is, therefore, not to be taken in a limiting sense and the scope of the present disclosure is defined by the appended claims and their equivalents.

The increasing prevalence of human-safe industrial robots is spurring interest in collaborative robotic systems, with which human users and robots interact around a set of semi-structured tasks, for SMEs and other emerging task domains such as aid for the elderly or impaired and collaborative surgical robotics. The range of tasks being performed in these task domains can change quickly, so a need exists for the collaborative robotic systems to gracefully adapt across tasks without requiring complete reprogramming.

Various embodiments of the present disclosure include systems and methods for enabling human-machine collaborations via a framework that supports a broad family of collaboration design and use patterns. An exemplary human-machine collaborative system according to various embodiments of the present disclosure implements a generalizable framework that supports the composition, dynamic adaptation, and management of reusable robot capability representations, to enable at least one specific mode of operation, training, troubleshooting, or re-tasking of one or more robots by one or more human users. Dynamic adaptation of robotic capability representations includes generalizing information and parameters captured by the collaborative system about tools, workpieces, and/or a robot's work environment, which the collaborative system can store in general robot capability representations and reuse for various types of task actions. Types of task action can include, for example, motion constraint, motion instant replay, trajectory generation, and the like. Dynamic adaptation of robotic capability representations also includes specializing general robot capability representations to perform specific task actions. The generalizable framework supports the composition, reuse, and management of human-machine collaborative behaviors, which include compositions of capability representations, e.g., robot capabilities and user interaction capabilities, and mappings between the capability representations. By implementing the generalizable framework, the collaborative system can be instructed or trained in a generalizable way to perform a wide range of tasks and task actions, and can switch between tasks gracefully without retraining or complete reprogramming.

In the present disclosure, the word "robot" will be used instead of robotic manipulator or set of robotic manipulators. Typically, a robot is an industrial robotic manipulator or a set of industrial robotic manipulators for automated or semi-automated production applications. A robot's envelope space is the range of motion over which the robot can physically move or reach, which includes a set of points in space that can be reached by the robot's end-effector, which can be a tool effector attached to the robot or a tool grasped or held by a gripper-type end-effector attached to the robot. For example, the robot's envelope space can include the range of motion over which a tool effector point ("TEP") of the robot can physically move or reach. The robot's TEP can be defined as a reference point in a point cloud of the tool effector attached to the robot (e.g., a user-selected point, the tool effector's endpoint, its point of attachment to the robot, etc.) or the tool grasped by the robot's end-effector (e.g., a user-selected point, the tool's endpoint, the point at which the end-effector grasps the tool, etc.). The size and shape of the robot's envelope space depend on the coordinate geometry of the robot and are influenced by the robot's design, such as the robot's configuration (e.g., types of joints, the joints' range of movement, lengths of links connecting the joints, etc.), number of degrees of freedom ("DOF"), and the like. In some embodiments, the size and shape of the robot's envelope space can also be influenced by the size and shape of the tool effector attached to the robot or the tool grasped by the robot's end-effector. The robot can perform work within its maximum workspace, which generally contains all or almost all of the points in the robot's envelope space. The collaborative system can constrain the robot's workspace to a subset of the points in the robot's maximum workspace to enforce or apply one or more constraints, which is described in greater detail below.

Through the generalizable framework, the collaborative system can interact with at least one human user to capture task knowledge used to collaboratively perform a task with at least one robot, and then adapt the captured task knowledge to collaboratively perform other tasks with the robot and/or at least one other robot, in an efficient and portable manner. The collaborative system becomes more capable as more task knowledge is captured, and as the collaborative system becomes more capable, less information is needed from the user per task. Moreover, the nature of the captured tasked knowledge can progress from low-level (e.g., manual demonstration of dense trajectories) to higher-level (e.g., point-and-click inputs, verbal commands, etc.). As system capability increases and the need for detailed user interaction decreases, the collaborative system can scale down for new applications and be gradually introduced into environments that have not classically incorporated automation due to a lack of environmental structure or modeling.

In various embodiments, the generalizable framework defines and provides models for (1) capabilities, which are higher order functions that map input information to output information or actions based on infrequently-changing parameters, and (2) collaborative behaviors, which are mappings between at least one unknown dimension of a task to at least one appropriate interface for the human user to work with the robot to complete the task. The generalizable framework can provide for different classes of capabilities, including robot capabilities and user interaction capabilities. Robot capabilities serve as reusable robotic capability representations that can be specialized for specific tasks, and a robot capability models at least one functionality of the robot at runtime and can connect to either a user interaction capability or other robot capabilities. User interaction capabilities provide one or more interface modalities to the user by either requiring input commands or displaying feedback. Through the use of capabilities and collaborative behaviors provided by the generalizable framework, the collaborative system provides an environmental structure for flexible human-robot collaborations that can account for the dynamic nature of collaborative interactions.

The collaborative system can create a general robot capability by capturing and generalizing information from one situation, and then specialize the general robot capability for different and even novel situations by instantiating and parameterizing the general robot capability with one or more situation-specific parameters. A general robot capability models at least one functionality of the robot for using an attached tool of a tool type to perform a type of task action that requires a set of task-related parameters. In various embodiments, the collaborative system can dynamically adapt robot capabilities for task actions of various types based on three types of task-related parameters: tool behavior constraints or tool affordances, tool movement primitives, and perceptual templates.

A tool behavior constraint for a tool can be determined based on at least one tool affordance of the tool. A tool affordance is one or more features, properties, attributes, or characteristics of the tool that affords or enables an entity (e.g., a robot, a person, another tool, and the like) to perform one or more actions with the tool. The collaborative system can capture information via motion demonstrations, parameters about tools and workpieces, and parameters which relate one or more task actions to the robot's work environment. The captured information can be encapsulated and generalized and then stored in a reusable robot capability representation. For instance, certain drill parameters are valid for more than one type of drill bit or workpiece, and motion demonstrations can define archetypal motions that can be modulated for a specific situation, such as linear drilling motions parallel to a longitudinal axis of an attached drill bit.

The collaborative system can create a collaborative behavior by composing one or more robot capabilities for performing specific task actions or task actions of specific types into a composition of robot capabilities, and mapping one or more user interaction capabilities that meet the robot capabilities' requirement for user interaction to the robot capabilities. To provide task- or subtask-specific robotic assistance or augmentation, the collaborative system can modify the composition of robot capabilities and/or specialize the robot capabilities to the specific needs of a given task through end-user demonstration and/or lightweight parameterization and interaction. The collaborative system supports dynamic adaptation of existing robot capabilities and collaborative behaviors to perform new tasks, thus facilitating rapid robot training for simple tasks and enabling flexible interaction with various tools and workpieces that makes robot training for complex tasks more intuitive. By implementing the generalizable framework, the collaborative system enables simple and intuitive robot programming, reprogramming, training, and retraining by users (e.g., end-users, on-site engineers, and the like), through user interaction, user demonstration, flexible interaction with various tools and workpieces, and the like.

The collaborative system can offload task knowledge and authority to use that knowledge, which can be implemented using instances of robot capabilities in the form of robot capability elements ("RC elements"), onto the robot. The collaborative system can also provide appropriate user interface ("UI") elements, which can be implemented using instances of user interaction capabilities in the form of user interaction capability elements ("IC elements"), for the user to collaborate with, interact with, and/or give inputs to the robot. The set of capability elements (e.g., RC elements and IC elements) necessary for performing a task may vary depending on the complexity of the task, because the task knowledge, the authority to use that knowledge, and the user input required for performing the task may change with that complexity.

Capabilities

In various embodiments, a capability is defined as a higher order function that maps input information to output information or action based on an information kernel, which is defined as one or more infrequently-changing parameters. Without loss of generality, such parameters can be functions that are evaluated at runtime. The collaborative system can use a capability to successfully execute one or more robotic actions in a dynamic and uncertain environment.

More formally, a capability C can be defined as $C(\kappa): \gamma \rightarrow \phi$, where K is the information kernel, $\gamma$ is the set of inputs to the capability, and $\phi$ is the set of outputs. If information kernel $\kappa$ is undefined, then capability C is considered uninstantiated or general, and thus lacks the necessary information to operate on inputs $\gamma$. The generalizable framework also defines two composition operators: serial composition, ⊙, and parallel composition, ⊕. Those skilled in the art will appreciate that other composition operators are possible without departing from the spirit and scope of the present disclosure. Through the use of composition operators, capability C can be composed of other capabilities. Thus, capability C can be a composition of other capabilities and be considered a composite capability. Conversely, capability C can be considered a base capability if capability C includes no other capabilities.

The serial composition operator, ⊙, is generally non-commutative and represents connecting outputs of one capability into the inputs of another capability:

$$C_A(\kappa_A) \odot C_B(\kappa_B):\gamma_A \rightarrow \phi_B$$

The parallel composition operator, ⊕, is commutative and represents the union of two capabilities:

$$C_A(\kappa_A) \oplus C_B(\kappa_B):(\gamma_A \cup \gamma_B) \rightarrow (\phi_A \cup \phi_B)$$

In parallel composition, outputs $\phi_A$ and $\phi_B$ are assumed to be disjoint without loss of generality because capabilities can be composed with a decision function that picks conflicting outputs from $C_A$ or $C_B$. Additionally, both kinds of composition of capabilities require the union of information kernels for the composited capabilities.

Capabilities can be classified into user interaction capabilities and robot capabilities. A user interaction capability U∈Ŭ, where Ŭ is the set of all user interaction capabilities available to the collaborative system, provides one or more interface modalities to the user by either requiring input commands or displaying feedback.

A robot capability R∈Ř, where Ř is the set of all robot capabilities available to the collaborative system, models at least one functionality of the robot at runtime and can connect to one or more user interaction capabilities and/or one or more other robot capabilities. Examples of robot capabilities are shown in Table 1.

kernel $\kappa_{drill}$ containing common motion constraints necessary for using drills, the collaborative system can instantiate general robot capability $R_{mc}$ to form an instantiated robot capability $R_{mc}(\kappa_{drill})$ for providing a drill motion constraint. In this example, information kernel $\kappa_{drill}$ encapsulates parameters for mapping a geometric feature of the drill to a Cartesian constraint, and the collaborative system can reuse these parameters for any tool with the same feature (e.g., other drills). Furthermore, the collaborative system can instantiate general robot capability $R_{mc}$ to constrain not only drills but other tools without changing its interfaces γ and φ.

Specializing Capabilities

In various embodiments, the user can use the collaborative system to specialize capabilities through instructions that define information kernels based on a set of specified parameters, demonstrations, or other user-provided information. An instruction can be defined as a method of using a user demonstration or parameterization to create a new information kernel or specify parameters of an existing information kernel. Using the above-described example task of precisely drilling holes, to specialize robot capability $R_{mc}$ for drilling, the user can perform an instruction $I_{drill}$ specifying a mapping from drill geometry to constraint geometry. The collaborative system can encapsulate this mapping in $\kappa_{drill}$ and in so doing, specialize $R_{mc}$ to $R_{mc}(\kappa_{drill})$.

The collaborative system can specialize capabilities based on various classes of information useful for performing various types of task actions, including (1) tool affordances using tool behavior constraints, (2) motion trajectories using TMPs, and (3) perceptual grounding using perceptual templates. For example, the collaborative system can specialize a capability in response to the user performing an instruction to specialize the capability, with the instruction specifying (1) a tool behavior control that describes how a tool works and provides one or more behavior controls on the use of the

TABLE 1

Examples of Robot Capabilities

| Capability Name | Symbol | Input γ | Output φ | Instantiated/Specialized By |
|---|---|---|---|---|
| (a) motion constraint | $R_{mc}$ | pose (SE(3)) | constrained pose (SE(3)) | tool behavior constraints |
| (b) motion instant replay | $R_{ir}$ | start pose (SE(3)) | joint velocity commands | tool movement primitives ("TMPs") |
| (c) trajectory generator | $R_{tg}$ | start and end poses (SE(3)) | joint velocity commands | TMPs, perceptual templates |

Robot capability R can be initially general or uninstantiated, and in this form is generalizable for a space of tasks and task actions defined by the parameterization of information kernel κ. The collaborative system can parameterize robot capability R with information kernel κ for a specific situation to form an instantiated robot capability R(κ). The collaborative system can then operate instantiated robot capability R(κ) with input γ to produce output φ, such as commanding the robot to perform one or more specific task actions.

To perform an example task of precisely drilling holes collaboratively with the robot enforcing motion constraints, the collaborative system requires two capabilities: a user interaction capability that receives pose commands from the user, and a general robot capability $R_{mc}$ that moves the robot subject to constraints imposed by an information kernel describing a particular drill. An example of general robot capability $R_{mc}$ is shown in Table 1. Given an information tool to perform task actions, (2) a TMP that describes one or more motions involved in performing a task action, and/or (3) a perceptual template that provides one or more behavior controls in the context of the robot's work environment. Those skilled in the art will appreciate that other classes of information can be used to specialize a capability without departing from the spirit and scope of the present disclosure.

Tool Behavior Constraints

Tools are typically designed with a certain use case in mind, particularly in the domain of industrial manufacturing, which usually involves constraints on motions that can be made with the tools to perform tasks. The framework implemented by the collaborative system formalizes this aspect of tool use as tool behavior constraints. More particularly, a tool behavior constraint associated with a tool describes a preconceived notion of how the tool works and provides one or more behavior controls and/or motion constraints on the use of the tool in performing one or more task actions. The tool behavior constraint can be determined based on at least one tool affordance of the tool. Tool affordance is defined as one or more features, properties, attributes, or characteristics of the tool that affords or enables an entity to perform one or more actions with the tool. When the user wants the robot to perform or assist in a task that calls for the use of the tool or another tool having characteristics and features substantially identical to those of the tool, the user can parameterize at least one tool behavior constraint associated with the tool to give the robot a notion of how the tool can be used to perform the task. The user can parameterize the tool behavior constraint for the tool by specifying the geometry of the tool, where the robot grasps or attaches the tool, etc.

When modeling robot capabilities concerning tools, the collaborative system can leverage the fact that each tool or type of tool has geometric features that afford useful action and thereby place a constraint on the motions that can achieve the useful action. For example, a drill's cylindrical bit constrains the drill's motion along a line, and when a drill is being used for hole-drilling, an attached drill bit defines an axial translation direction; similar constraints apply to a hole-puncher or a sheet-metal stamper. For another example, a sanding or polishing tool generally has a planar operating surface, which constrains the tool's motion to tangential contact along the planar operating surface. Similarly, various tool behavior constraints apply to other tool applications, such as a cutting tool, which is often restricted to straight lines or curves.

More formally, a tool t can be represented as a 3-tuple t= $\langle r, A, G \rangle$, where r is a representation or model of the three-dimensional ("3-D") geometry of tool t, $A=\langle a_0, a_1, \ldots, a_n \rangle$ is a set of behavior constraints, and $G= \langle g_0, g_1, \ldots, g_n \rangle$ is a set of grasp configurations relative to representation r. The collaborative system can use tool t to represent a specific tool or any tool in a specific class of tools that share substantially identical characteristics and features. Assuming a fixed end-effector, $g_t \in SE(3)$ is a specific tool-relative position. Each behavior constraint is, in turn, a pair $a=\langle p, q \rangle$, where $p \in SE(3)$ is a constraint frame and q is a constraint type, i.e., $q \in \{$axis, curve, angle, plane, ... $\}$. For tool t, the collaborative system can generate a constraint frame p based on a constraint type q by fitting representation r of tool t to constraint type q. Representation r can model tool t in whole or in part. By mapping the geometry of tool t in the form of representation r to constraint type q, the collaborative system can form a reusable information kernel $\kappa_t$ to specialize a robot capability R (e.g., motion constraint capability $R_{mc}$ as shown in Table 1) into a specialized robot capability $R(\kappa_t)$. When tool t is attached to the robot, the collaborative system can operate specialized robot capability $R(\kappa_t)$ to control the robot. Examples of various types of tool behavior constraint are shown in Table 2 and illustrated in FIG. 1A.

When the robot grasps or captures a tool, the collaborative system can use one or more tool behavior constraints associated with the tool to define one or more constraints that allow tool movement to be resolved into constrained DOF and externally controlled DOF, for instance, by using null-space projection methods. For example, the collaborative system can specify a tool behavior constraint associated with the tool by starting with a representation of the tool's geometric features, such as a 3-D point cloud of the tool. The collaborative system can provide the representation of the tool by having the user select an existing representation, generate a new representation, or select and modify an existing representation. In various embodiments, the collaborative system can also autonomously provide the representation of the tool. The user can use the collaborative system to interactively select a region of the point cloud as the tool origin and then select a constraint type. Based on the selected region and constraint type, the collaborative system can determine the tool tip frame and one or more tool behavior constraints with respect to the tool origin. The collaborative system can map any region of the tool to a tool behavior constraint based on user selection. The collaborative system can also select any region of the tool's point cloud or use the tool origin or tool tip frame as the tool's TEP based on user selection or other considerations.

For example, assuming that a tool $t_1$ is a drill, the collaborative system can provide a 3-D representation $r_1$ of the drill that includes a representation $r_{bit}$ of an attached bit and then select "axis" as constraint type $q_1$. Thus, when tool $t_1$ is attached to the robot, representation $r_1$ or $r_{bit}$ imposes an axial constraint on the robot's motions while the robot uses tool $t_1$ to perform drilling tasks. By mapping the geometry of tool $t_1$ in the form of representation $r_1$ and/or the attached bit in the form of representation $r_{bit}$ to constraint type $q_1$, the collaborative system can form a reusable 6 DOF information kernel $\kappa_{drill}$ to specialize, for instance, motion constraint robot capability $R_{mc}$ (as shown in Table 1) into specialized robot capability $R_{mc}$ ($\kappa_{drill}$). The collaborative system can then operate specialized robot capability $R_{mc}$ ($\kappa_{drill}$) to constrain the robot's motion when using tool $t_1$.

Tool Movement Primitives

TMPs describe motions that a robot makes with a tool to perform a task; the tool can be a specific tool or any tool in a class of tools that share similar or even substantially identical characteristics and features. In various embodiments, the collaborative system can represent reusable motions as TMPs in a manner that captures tool-related features and parameters while leaving other parameters unconstrained. TMPs can extend Dynamic Movement Primitives ("DMPs"), which provide a foundation for reusable motion representations that can be re-parameterized while maintaining the structure of the motion.

A TMP can encapsulate trajectory data in the context of the tool and one or more points or other constraints in the robot's workspace and/or environment. More formally, a TMP T can be represented as $T=\langle a, d \rangle$, where $a=\langle p, q \rangle$ is

TABLE 2

Examples of Constraint Types

| Type q | Tool Effector Mapping | Free DoF | Tool Usage Example |
|---|---|---|---|
| axis, parallel | frame p at distal point, x-axis in direction d | axial motion and rotation along axis | drilling, punching, stamping |
| plane | frame p at center, x-axis in normal direction | planar motion y/z-plane, rotation around x-axis | sanding, polishing | a tool behavior constraint associated with the tool and d denotes a demonstrated trajectory. TMP T can be a DMP constructed in one of the tool behavior constraint frames $p_1 \ldots p_n$, thus allowing the collaborative system to capture the relative orientation or alignment between the tool and the trajectory frame, instead of the orientation of the robot's end-effector with respect to some arbitrary world frame. In this way, a robot capability (e.g., a motion instant replay capability $R_{ir}$ or a trajectory generator capability $R_{tg}$ as shown in Table 1) specialized by TMP T can be re-parameterized for different work environments, and the motion can be properly reused for any tool sharing the tool behavior constraint specified in TMP T.

The collaborative system can generate a TMP associated with the tool by first acquiring trajectory data via user demonstration, relevant UIs, or a combination thereof, and then generalizing the trajectory data for use in various tasks that involve using the tool. The trajectory data describes one or more motions involved in using the tool to perform actions for completing the task. The collaborative system can acquire the trajectory data via user demonstration by entering a learning mode, having the user demonstrate the motions, and perceiving or sensing the demonstrated motions to capture the trajectory data.

Using a sanding task as an example, the user can demonstrate a spiral sanding trajectory with a sander that progresses out from a starting point, in plane with the sander's face. The collaborative system can acquire or capture the shape of the spiral sanding trajectory and the alignment or orientation of the sander with respect to the direction of the trajectory. For instance, the collaborative system can capture that the sander's face is parallel to the direction of the trajectory. The collaborative system can also generate a TMP $T_{sander}$ that encapsulates the spiral sanding trajectory in the context of the starting point and the alignment or orientation of the sander in the context of the direction of the spiral sanding trajectory.

Subsequent to trajectory data acquisition, the collaborative system can generate the TMP by generalizing the trajectory data. The collaborative system can adapt or re-parameterize the TMP for a new task based on, for example, a user-specified point and/or a perceptual template associated with the new task. In various embodiments, the collaborative system can acquire the TMP by having the user move the robot via admittance control along a 6 DOF pose trajectory. The collaborative system can store the pose trajectory as a DMP or a TMP, which can be used generatively to create a novel motion given one or more target points in the robot's workspace or environment and/or one or more perceptual templates. The collaborative system can also store the pose trajectory relative to the robot's initial pose, so that when generating a novel motion, the collaborative system can constrain the motion to the tool tip frame of an attached tool and not some arbitrary coordinate system. For tool behavior constraints and TMPs encapsulated in capabilities, the collaborative system can save the resulting frame, geometric information, trajectory, and other data in at least one lightweight database that is available to other capabilities. Using the example TMP $T_{sander}$ described above, the collaborative system can apply the spiral sanding trajectory correctly, for example in a direction parallel to the sander's face, even if TMP $T_{sander}$ was recorded with a sander whose face was mounted at a different angle.

In various embodiments, the collaborative system can enforce one or more applicable tool behavior constraints associated with a tool when the user is demonstrating one or more motions involved in performing a task with the tool. More particularly, during a user demonstration, the collaborative system can enforce or apply the applicable tool behavior constraints by constraining the workspace of the robot to a subset of points within the robot's maximum workspace. When the user applies a force on or near the tool to direct or guide the robot during user demonstration, the user-applied force can have one or more components in one or more undesirable directions that would cause the robot (e.g., the robot's TEP) to exit its constrained workspace. To address this, the collaborative system can instruct the robot to stay within or return to the constrained workspace. The robot can be instructed to stay within the constrained workspace by resisting only the components of the user-applied force in the undesirable directions, resisting the user-applied force in whole, or the like. The robot can be instructed to return to the constrained workspace by providing negative force feedback (e.g., via impedance control, vibration or other forms of haptic feedback, etc.), moving the robot to a point in the constrained workspace and/or reorienting the robot when safe for the user, or the like. By enforcing the applicable tool behavior constraints associated with the tool, the collaborative system allows the user to more precisely and effectively demonstrate how to use the tool. The collaborative system can enforce the applicable tool behavior constraints during motion demonstration, for instance, by forming an information kernel $\kappa_{tool}$ for the tool, specializing motion constraint capability $R_{mc}$ with information kernel $\kappa_{tool}$ into a specialized robot capability $R_{mc}(\kappa_{tool})$, providing an instance of specialized robot capability $R_{mc}(\kappa_{tool})$ as an RC element, and operating the RC element to control the robot in compliance with the applicable tool behavior constraints.

For example, during a user demonstration of a drilling motion for performing the above-described drilling task, the collaborative system can instruct the robot to allow the user to move the drill only in a linear motion while the drill is activated, which assists the user in making a precise single-shot demonstration. The collaborative system can do so by constraining the workspace of the robot to a set of points in a straight line along the longitudinal axis of a drill bit attached to the drill. While the drill is activated, if the user attempts to direct the robot via user-applied force to deviate from the line along the drill bit's longitudinal axis, the collaborative system can instruct the robot move only in the direction along the drill bit's longitudinal axis, for instance, by resisting one or more components of the user-applied force in one or more undesirable directions (e.g., allowing only the component of the user-applied force in the direction along the longitudinal axis of the drill bit). Alternatively or in addition, the collaborative system can instruct the robot to provide negative feedback via a damping force countering the user-applied force, return to the constrained workspace when safe for the user, reorient the end-effector so the drill bit returns to the constrained workspace when safe for the user, etc. For another example, during a user demonstration of a sanding motion for performing the above-described sanding task, the collaborative system can instruct the robot to allow the user to move the sander only in a motion tangential to a plane (e.g., planar motion) or a predefined surface while the sander is activated.

Perceptual Templates

Perceptual templates support the definition of constrained tool movement by providing one or more behavior controls that are described with respect to perception data associated with the robot's work environment, such as one or more characteristics of a target workpiece being worked on, one or more points in the robot's workspace, and the like. Thus, a perceptual template provides one or more behavior controls in the context of the work environment. More formally, a perceptual template P is a pair P=⟨S, E⟩ that relates a selected scene region S to specified geometric entities E=[$e_1 \ldots e_n$] in the scene. Scene region S can be a selected volume of 3-D point cloud or red, green, and blue plus depth ("RGBD") data, a selected two-dimensional ("2-D") region of an image, and the like. A geometric entity $e_i$ of geometric entities E is a task relevant geometric feature, such as a point, a line or curve, a plane or surface, a 3-D space, and the like. The collaborative system can use perceptual templates to ground tool behavior constraints, TMPs, and other task constraints to perception data. While tool behavior constraints and TMPs provide mechanisms for reusing constraint and motion data, perceptual templates provide task-related parameters that need to be specified to perform task actions but are not captured by tool behavior constraints or TMPs.

The task-related parameters can be user-specified with respect to the robot's work environment, such as parameters that are specified relative to the position and/or orientation of the target workpiece. Alternatively or in addition, the collaborative system can obtain perception data descriptive of the robot's work environment and relevant to the task-related parameters provided by the perceptual templates. The collaborative system can obtain the perception data from perception or detection (e.g., via a sensor, a camera, and the like), user interaction (e.g., via an interactive setup, direct user input or selection, and the like), stored data, or a combination thereof. The collaborative system can continually obtain the perception data at a suitable rate (e.g., 1 Hz, 5 Hz, etc.) to allow the user to reposition or move the target workpiece. Stored data can include data values and information associated with one or more reusable task-related parameters, such as data values associated with a type of workpiece, data values previously inputted for performing a similar task on a similar type of workpiece, and the like. The user can also store data and information acquired via perception and/or user interaction in one or more perceptual templates associated with the target workpiece or its type.

In various embodiments, the collaborative system can obtain the perception data while operating a robot capability to perform task actions. Subsequent to obtaining perception data, the collaborative system can specify the task-related parameters based on the perception data to ground any tool behavior constraint and TMP associated with the robot capability and any task constraint. Accordingly, the collaborative system can reuse the task-related parameters while performing task actions without a priori knowledge of the robot's work environment, such as the target workpiece's position and/or orientation relative to the robot.

For an example task of repeatedly drilling a pattern of holes on a run of parts in a semi-automated fashion, an applicable perceptual template $P_{holes}$ can include task-related parameters that need to be specified to perform the example task, such as a drilling angle relative to a workpiece surface, a pattern of holes to be drilled relative to one or more points on the workpiece surface, and the like. The pattern of holes can be represented as lines at an angle relative to the workpiece surface. While operating a robot capability to perform task actions, the collaborative system can use perceptual template $P_{holes}$ to obtain perception data, such as a target workpiece surface $S_w$, one or more reference points on target workpiece surface $S_w$, an orientation of target workpiece surface $S_w$, etc. For each part in the run of parts, the collaborative system can use perceptual template $P_{holes}$ to (1) obtain relevant perception data descriptive of the part, (2) specify relevant task-related parameters based on the perception data, (3) specialize a robot capability R (e.g., trajectory generator capability $R_{tg}$ as shown in Table 1) by setting $\kappa = P_{holes}$ to form a specialized robot capability $R(P_{holes})$, (4) provide an instance of specialized robot capability $R(P_{holes})$ as an RC element, and (5) use the RC element to instruct the robot to drill at locations specified by the pattern of holes on the part's target surface $S_w$ at the specified angle relative to target surface $S_w$.

The perception data can be obtained using one or more sensors, from the user, from stored data, or a combination thereof. For instance, the collaborative system can first perceive one or more workpiece surfaces and their orientations by obtaining input depth data with a camera and detecting one or more planar surfaces of the workpiece in the input depth data. The collaboration system can then prompt the user to select a target surface $S_w$ from the target workpiece surfaces, one or more reference points on target surface $S_w$, and/or a pattern of holes. The collaborative system can also load a previously saved pattern of holes.

Instructor for Specializing Capabilities

In various embodiments, the collaborative system provides at least one instructor for generating instructions based on a set of specified parameters, demonstrations, or other user-provided information. The instructor can be used to create new information kernels or specify parameters of existing information kernels, with which the collaborative system can specialize robot capabilities. The collaborative system can invoke the instructor to obtain different classes of information, such as tool behavior constraints, motion trajectories in the form of TMPs, perceptual templates, and the like.

To generate an instruction for specifying one or more tool behavior constraints, the instructor can provide a representation (e.g., a 3-D point cloud) of a tool selected by the user or based on a tool attached to the robot. The representation can include at least one tool origin point. The instructor can select a region in the representation and a constraint type, either autonomously or based on an interactive user selection. The instructor can then fit the representation of the tool to the constraint type based on the selected region and constraint type to define a constraint frame, and thus can generate the tool effector and one or more tool behavior constraints relative to the tool origin point. Any region of the tool can be mapped to a tool behavior constraint based on user selection. The instructor store the tool behavior constraints and can generate an instruction for specifying the tool behavior constraints in the form of a formatted information kernel, which can be loaded by any capability requiring one or more tool behavior constraints, such as motion constraint capability $R_{mc}$ shown in Table 1.

Figure 1B:
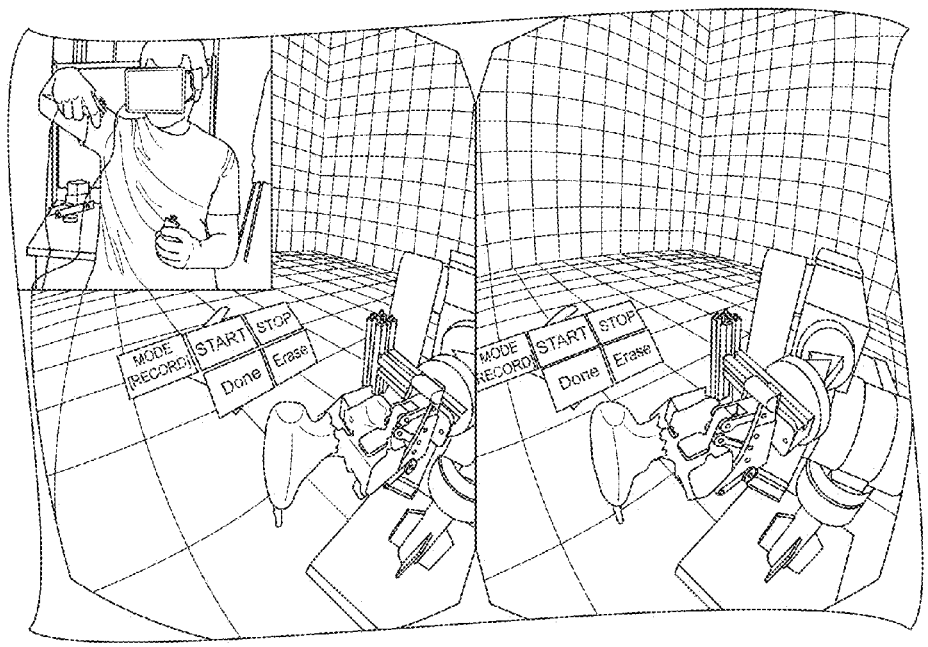
FIG. 1B shows an immersive virtual reality environment in which a user can interact with an avatar of the robot to specify motion trajectories, consistent with embodiments of the present disclosure.

To generate an instruction for specifying one or more motion trajectories for using a specified tool or a tool in a specified class in the form of one or more TMPs, the instructor can provide a user interface for acquiring the motion trajectories. For example, the instructor can provide an immersive virtual reality ("VR") environment as shown in FIG. 1B. Through the VR environment, the user can interact with an avatar of the robot to specify motion trajectories. The user can hold a virtual tool proxy, such as a 3-D pointing device, in a position identical to how the tool is grasped by the robot, and demonstrate any number of 6 DOF motion trajectories. The instructor can record the demonstrated motion trajectories as one or more DMPs with respect to a selected tool, generate one or more TMPs based on the DMPs and a constraint frame associated with the tool, and store the TMPs for the selected tool or a tool in the specified class. The instruction for specifying the TMPs generates a formatted information kernel that can be loaded by any robot capability requiring one or more TMPs, such as motion instant reply capability $R_{ir}$ or trajectory generator capability $R_{tg}$ shown in Table 1.

To generate an instruction for specifying one or more perceptual templates, the instructor can perceive a scene in the robot's work environment and provide a user interface that displays the scene in real-time and allows the user to select one or more points, lines, or planes in the scene. For example, the instructor can perceive the scene using an RGBD sensor, detect candidate features (e.g., a workpiece's vertices, edges, surfaces, etc.) in the scene, and display in real-time a 3-D visualization of the scene and any candidate features. The instructor can select, autonomously or based on user selection, at least one reference feature from the candidate features. The instructor can also select template features based on user selection and define each template feature in the context of the reference feature, such as each template feature's relative position, angle, orientation, depth, or other attributes with respect to the reference feature. For instance, the instructor can select a candidate surface of the workpiece as the reference surface and a user-selected pattern of holes to be drilled as the template features. The angle of each hole in the pattern can be defined relative to the reference surface, and the position of each hole can be defined relative to two or more edges of the reference surface. The instructor can store the candidate features, the reference feature, and/or the template features, as well as the relationship between the features in the perceptual templates. The instruction for specifying the perceptual templates generates a formatted information kernel that can be loaded by any robot capability requiring one or more perceptual templates, such as trajectory generator capability $R_{tg}$ shown in Table 1.

Collaborative Behaviors

Collaborative behaviors include compositions of one or more robot capabilities, one or more user interaction capabilities, and mappings between the robot capabilities and the user interaction capabilities. While robot capabilities can be built up and composited for controlling the robot to perform particular task actions or task actions of particular types, the collaborative system relies on collaborative behaviors to provide the user with interfaces necessary for user interactions with the collaborative system and/or the robot for any particular robot behavior and level of capability. In at least this aspect, the collaborative system differs from existing robotic systems, which focus solely on the high level user-robot collaborative relationship but neglect the low level interface elements.

For each robot capability in a composite capability, the collaborative system needs explicit information regarding what input is required of the user, what feedback should be presented to the user, and therefore what user interaction capabilities are required. Suppose a robot capability $R=\gamma_R \to \phi_R$ is composited through the composition operators (e.g., $\odot$ and $\oplus$) from a set of n instantiated or specialized robot capabilities $\{R_1(\kappa_1), \ldots, R_n(\kappa_n)\}$. For robot capability R and the set of all user interface capabilities available to the collaborative system, $\check{U}$, the compatibility function, $\Delta$: $\check{R} \times \check{U} \to \{0, 1\}$, selects an appropriate set of user interface capabilities $\{U: \gamma_U \to \phi_U\}$, with $U \in \check{U}$ that provides either inputs to R or accepts outputs from R, but not both, because any feedback loops are closed through a human operator (e.g., the user):

$$\Delta(R, U) = \begin{cases} 1: & (\phi_R \subseteq \gamma_U) \veebar (\phi_U \subseteq \gamma_R) \\ 0: & \text{otherwise} \end{cases}$$

Figure 2:
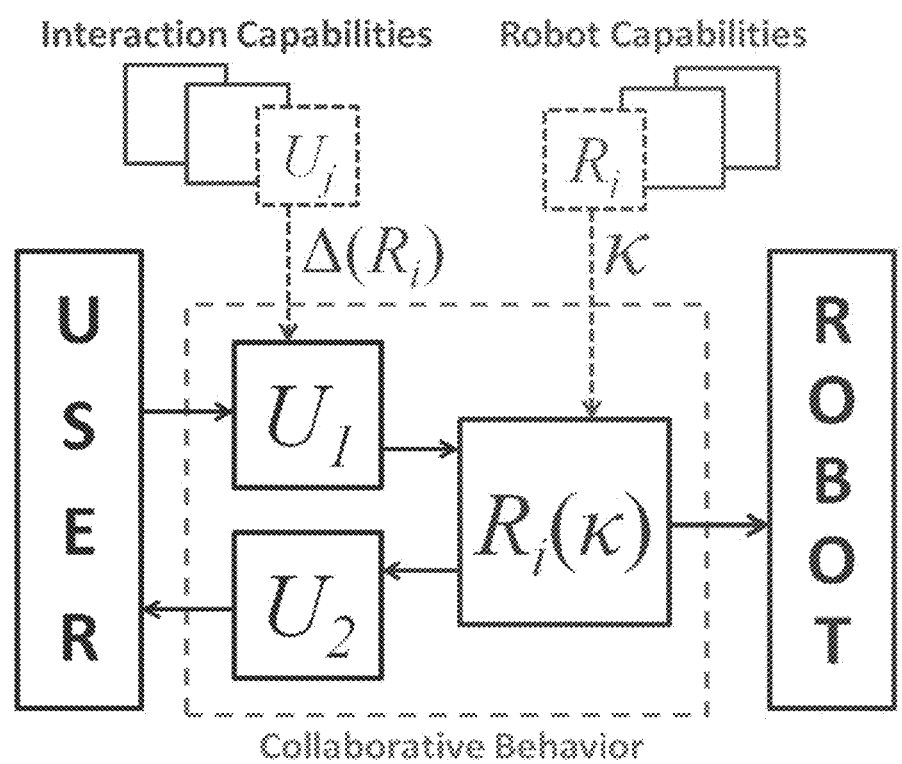
FIG. 2 illustrates an example of a collaborative behavior that includes a composition of capabilities connected to the user and the robot.

Accordingly, a collaborative behavior B can be defined as a composition of robot capability R, where all user interaction requirements for the composition of robot capability R are met by a set of user interaction capabilities $\{U_j | U_j \in \check{U}, \Delta(R, U_j)=1\}$. Robot capability R can be a base robot capability or a composite robot capability. FIG. 2 illustrates an example of a collaborative behavior that includes a composition of capabilities communicatively connected to the user and the robot. It should be noted that the collaborative system manages connections between the capabilities in the collaborative behavior to control what information is passed to and from the user, but does not design nor dictate any particular design for user interfaces associated with the capabilities. Instead, creators and designers of the capabilities are free to design user interfaces associated with the capabilities.

To perform the above-described example task of precisely drilling holes collaboratively with the robot enforcing motion constraints, the collaborative system can generate and/or modify a composition of capabilities and store the composition in a collaborative behavior $B_1$. For the example task, drill-specialized motion constraint robot capability $R_{mc}$ ($\kappa_{drill}$) requires at least one 6 DOF command from the user. The collaborative system can select, based on compatibility function $\Delta$, a force guidance user interaction capability $U_{force}$ that has the required output matching the 6 DOF command. Therefore, collaborative behavior $B_1$ can be $B_1=U_{force} \odot R_{mc}(\kappa_{drill})$. The collaborative system can use a similar approach to derive more complex interaction requirements for other tasks, such as a task of drilling similar holes at locations guided manually by the user or the example task of repeatedly drilling a pattern of holes on a run of parts in a semi-automated fashion described above with respect to perceptual templates.

Exemplary Embodiments

Figure 3A:
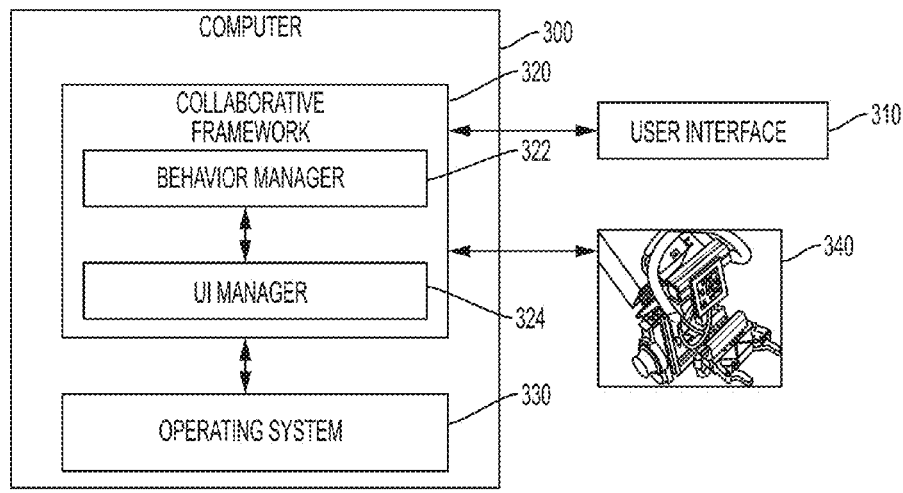
FIGS. 3A and 3B illustrate exemplary embodiments of a human-machine collaborative system consistent with the principles of the present disclosure.
Figure 3B:
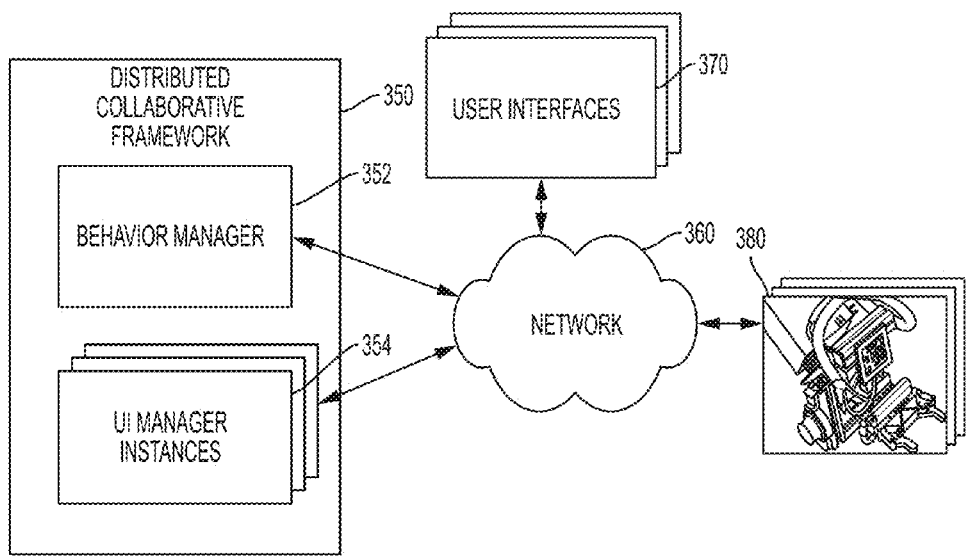

FIGS. 3A and 3B illustrate exemplary embodiments of the collaborative system consistent with the principles of the present disclosure. In various embodiments, an example of which is shown in FIG. 3A, the collaborative system can include a computer 300 that can interact with at least one user (not shown) via at least one UI 310. Computer 300 can be a general purpose or application-specific computer that is well known to those skilled in the art, such as a desktop, a laptop, a tablet, a mobile device, a robot controller, a server, a cluster, etc., or any combination thereof. Computer 300 can also be a machine of any suitable type, such as a virtual machine, a physical machine, etc., or any combination thereof. Software installed on computer 300 can include a collaborative framework 320 and at least one operating system ("OS") 330.

Collaborative framework 320 is an example implementation of the above-described generalizable framework that defines and provides models for capabilities, links, and collaborative behaviors. Collaborative framework 320 can communicate and interact with at least one robot 340 and/or the user to learn and/or provide collaborative/assistive functionalities associated with the collaborative behaviors. For example, the user can teach one or more motions associated with a collaborative/assistive functionality to collaborative framework 320 via user demonstration by directing robot 340 through the motions. Collaborative framework 320 can use UI 310 to communicate and interact with the user, and can provide UI 310 via one or more components or peripherals of computer 300, such as a visual display, a pointing device or controller, a keyboard/keypad, an electroacoustic transducer, a kinetic or tangible user interface, etc., or any combination thereof. A pointing device or controller can include, for example, a mouse, a 3-D pointing device, a touchscreen, a touchpad, a joystick, a teach pendant, and the like. Collaborative framework 320 can also provide UI 310 via one or more components of robot 340, such as a sensor, an actuator, etc., or any combination thereof. A sensor can include, for example, a force sensor, a position sensor, a visual sensor, a tactile sensor, and the like. One skilled in the art will recognize that UI 310 can be provided using other components and peripherals without departing from the spirit and scope of the present disclosure.

Collaborative framework 320 can be supported by and/or built on top of OS 330. OS 330 can be any commercial, open-source, or proprietary operating system or platform, such as the ROBOT OPERATING SYSTEM ("ROS"), which can function as a middleware for component-based composition of software functionality and network and process management. Other well-known examples of operating systems that are consistent with the principles of the present disclosure include LINUX, UNIX, ORACLE SOLARIS, MICROSOFT WINDOWS, MAC OS, OPEN VMS, and IBM AIX.

Although FIG. 3A depicts collaborative framework 320 as providing UI 310 and being communicatively coupled to robot 340 via direct communications links, those skilled in the art will appreciate that collaborative framework 320 can provide UI 310 and/or be communicatively coupled to robot 340 via any suitable type of communication link, such as a network connection through at least one communication network like a local area network, a wide area network, an intranet, the Internet, etc. Those skilled in the art will also appreciate that the single-computer configuration and the arrangement of various parts of the collaborative system depicted in FIG. 3A are merely representative and that other configurations and arrangements, an example of which is illustrated in FIG. 3B and described in greater detail below, are possible without departing from the spirit and scope of the present disclosure.

As illustrated in FIG. 3A, collaborative framework 320 includes a behavior manager 322 that manages collaborative behaviors, robot capabilities, and links between robot capability interfaces (e.g., inputs γ and outputs φ), as well as a UI manager 324 that manages user interaction capabilities. With behavior manager 322 and UI manager 324 running as separate and distinct modules or processes, collaborative framework 320 can manage the collaborative behaviors, the robot capabilities, and the links separately and distinctly from the user interaction capabilities to maintain consistency with the conceptual definition of collaborative behaviors. The explicit separation of robot and user interaction capabilities allows behavior manager 322 and UI manager 324 to run on separate machines, whether physical or virtual, as long as the machines are communicatively coupled (e.g., networked) to each other. Moreover, collaborative framework 320 can include multiple instances of UI manager 324 running on one or more machines, an example of which is illustrated in FIG. 3B and described in greater detail below. Collaborative framework 320 can also include multiple instances of behavior manager 322 running on one or more machines (not shown) in a distributed manner.

Managing Robot Capabilities and Links

In various embodiments, collaborative framework 320 can invoke behavior manager 322 to compose (e.g., author, modify, store, delete, etc.) robot capabilities as well as manage (e.g., load, initialize, run, stop, terminate, unload, etc.) and dynamically adapt (e.g., specialize, generalize, re-specialize, etc.) RC elements at various states, including during runtime. Collaborative framework 320 can author robot capabilities in one or more programming languages such as C++, PYTHON, etc., and can implement robot capabilities as software elements that can be composed into composite elements. Robot capabilities can extend or be based on ROS nodes, which provide a communication layer and interfaces for typed connections between the software elements, e.g., instances of the robot capabilities. Collaborative framework 320 can implement links between inputs and outputs of robot capabilities as link elements in the form of published and subscribed ROS topics.

Collaborative framework 320 can provide instances of the robot capabilities as RC elements by calling ROS launch files associated with the robot capabilities. RC elements that have been provided by collaborative framework 320 can be in one or more of several states, including uninstantiated or general, instantiated or specialized, running, waiting, stopped, and the like. A general RC element contains code to read from and write to its interfaces (i.e., capability inputs and outputs) as well as code for performing task action of the desired type, but contains an uninstantiated info class that accepts an information kernel required for the RC element to function. Collaborative framework 320 can implement an information kernel as a specifically formatted data file that is loaded into memory at runtime and used to instantiate the info class and thus specialize the RC element. Collaborative framework 320 can include at least one instructor that generates information kernels and stores the information kernels in a database that is accessible to all capability elements.

Collaborative framework 320 can provide a specialized RC element based on a robot capability by specifying the robot capability and the required information kernel in the element launch file. Collaborative framework 320 can re-specialize an already-specialized RC element at runtime, by swapping out the specialized RC element's information kernel for a different information kernel. Using motion constraint capability $R_{mc}$ shown in Table 1 as an example, collaborative framework 320 can swap out an information kernel containing parameters associated with a tool for another information kernel containing parameters associated with a different tool, without having to unload motion constraint capability $R_{mc}$. For instance, collaborative framework 320 can swap out an information kernel $\kappa_{drill}$ a specialized motion constraint capability $R_{mc}(\kappa_{drill})$ for an information kernel $\kappa_{sander}$ to form a newly-specialized motion constraint capability $R_{mc}(\kappa_{sander})$, without having to unload $R_{mc}$.

Managing User Interaction Capabilities

In various embodiments, collaborative framework 320 can invoke UI manager 324 to author, modify, load, unload, store, and switch between user interaction capabilities at various states, including during runtime. Collaborative framework 320 can implement user interaction capabilities as software elements that can be composed into composite elements. Like RC elements, IC elements can extend or be based on ROS nodes, and thus sharing a common communication layer and interfaces with RC elements. Collaborative framework 320 utilizes IC elements to provide the user with one or more interaction paradigms, which can take the form of drivers or other forms of software interface with a peripheral such as a 2-D or 3-D display, touchscreen, etc. For instance, an admittance control interaction element that allows the user to manipulate a 6 DOF joystick attached to the robot can provide a mapping between the user's motions as input γ and the commanded pose output as output φ of the admittance control interaction element.

Managing Collaborative Behaviors

To implement collaborative behaviors, collaborative framework 320 provides tools for composing a composition of robot capabilities for a collaborative behavior, deriving user interface requirements of the robot capabilities in the composition, and mapping user interaction capabilities to the robot capabilities in the composition based on the derived user interface requirements. Collaborative framework 320 can compose the composition by specifying links between the robot capabilities in the composition. In various embodiments, collaborative framework 320 can build the composition by populating a behavior manifest, which can be a file formatted according a data specification or serialization format based on the YAML standard, JavaScript Object Notation, etc. Each behavior manifest can encapsulate one or more robot capabilities, user interaction capabilities, and links for a collaborative behavior into tags, under which capabilities and links required for the collaborative behavior are listed. Various capabilities can be specified in one or more launch files (e.g., ROS launch files) and/or files containing behavior manifests, and links can be specified based on one or more published and subscribed topics (e.g., ROS published and subscribed topics). For example, collaborative framework 320 can process one or more launch files that specify available capabilities, and can process one or more files containing a behavior manifest that encapsulates robot capabilities, user interaction capabilities, and links required by the collaborative behavior.

A behavior manifest 400 as shown in FIG. 4 is an example of a behavior manifest that specifies robot capabilities, user interaction capabilities, and links required by an admittance control collaborative behavior. Behavior manifest 400, which can be specified in the YAML wiring format, gives at least one user admittance control of at least one robot, with the option to constrain the robot's motion based on the tool currently being used and/or the workpiece currently being worked on. Behavior manifest 400 can include a behavior name 410 as a top-level key and behavior tags 420a-c as lower-level keys for lists 425a-c of required capabilities or links. List 425a can list a set of required robot capabilities, list 425b can list a set of required user interaction capabilities, and list 425c can list a set of required links. Those skilled in the art will appreciate that the format and content of behavior manifest 400 are merely representative and that other formats and contents are possible without departing from the spirit and scope of the present disclosure.

During startup, collaborative framework 320 can instruct behavior manager 322 to build a list of available robot capabilities, for example, by parsing the local file system for any launch file with a prefix associated with collaborative framework 320, and can also locate and read any file containing behavior manifests. Behavior manager 322 can load, engage, disengage, unload, and switch between collaborative behaviors while in various states, including during runtime or while at least one collaborative behavior is engaged. UI manager 324 and/or another module of collaborative framework 320 can define and provide one or more administrative UIs through which the user can perform various administrative functions.

Administrative functions can include viewing a list of various capabilities (e.g., robot capabilities and/or user interaction capabilities that are available to the user but not loaded, loaded, uninstantiated or general, instantiated or specialized, running, waiting, stopped, etc.), creating a new capability, selecting an existing capability for collaborative framework 320 to load, instantiate or specialize, uninstantiate or generalize, re-instantiate or re-specialize, unload, swap out, detail, modify, delete, etc., and other functions that can be performed in the same manner for different capabilities. Administrative functions can also include viewing a list of various collaborative behaviors (e.g., collaborative behaviors that are available to the user, loaded, engaged, etc.), creating a new collaborative behavior, selecting an existing collaborative behavior for collaborative framework 320 to load, engage, disengage, unload, swap out, detail, modify, delete, etc., and other functions that can be performed in the same manner for different collaborative behaviors. For example, the user can use the administrative UIs to browse a list of available collaborative behaviors and select a collaborative behavior for collaborative framework 320 to load and/or engage, detail, modify, delete, etc. For another example, the user can use the administrative UIs to browse for any engaged collaborative behavior and select any engaged collaborative behavior for collaborative framework 320 to disengage, unload, swap out, detail, modify, etc.

In response to collaborative framework 320 or any module therein receiving a command to load a collaborative behavior, behavior manager 322 can locate a composition of robot capabilities required by at least one behavior manifest associated with the collaborative behavior, and launch RC elements as separate child processes for the required robot capabilities. This allows behavior manager 322 to manage and gracefully transition between the RC elements, for example, by starting, stopping, restarting, terminating, or killing them as necessary; during such transitions, behavior manager 322 can halt the robot or instruct and wait for the robot to enter a halted state.

After launching all required RC elements, behavior manager 322 can then look to the behavior manifest for all links required by the collaborative behavior and/or the required RC elements. For each of the required links, behavior manager 322 can spawn a link element, or an explicitly generated temporary component containing logic to subscribe to a sending node (e.g., an RC element publishing to a given topic) and publish to a receiving node (e.g., an RC element subscribed to the given topic). This abstraction provides several benefits. By using link elements, each link can be compartmentalized into its own process, rather than having the link logic (publisher and subscriber) spawn directly in behavior manager 322, thus allowing behavior manager 322 to easily reorganize links between RC elements at runtime. This abstraction also allows for useful introspection because the graph-like structure of connected capability elements is retained. For example, the user can see explicit connections between the RC elements via a visualization tool (e.g., rqt_graph, an ROS graph visualization tool), rather than many RC elements all connected to the central hub of behavior manager 322.

As a result of using a separate process for each running RC elements and link elements, behavior manager 322 can easily implement and carry out various other behavior commands and management activities. In response to a command to unload a collaborative behavior, behavior manager 322 can simply terminate running RC elements and link elements associated with the collaborative behavior. In response to a command to switch from a first collaborative behavior that has already been loaded to a second collaborative behavior that is being requested but has not been loaded, behavior manager 322 can find intersecting robot capabilities shared by the first and second collaborative behaviors to load and unload only RC elements and link elements that are not shared by the first and second collaborative behaviors.

Behavior manager 322 can add or subtract individual RC elements and make or break individual links while in various states. For example, after loading or even engaging the collaborative behavior, behavior manager 322 can add one or more new individual RC elements and/or link elements to the collaborative behavior and can subtract one or more individual RC elements and/or link elements associated with the collaborative behavior; if the collaborative behavior is in an engaged state, behavior manager 322 can add or subtract the individual RC elements and/or link elements while maintaining as much of the functionality of the collaborative behavior as possible. Requests or commands to behavior manager 322 can be implemented as services (e.g., ROS services), so they can be easily connected to a graphical UI or invoked programmatically.

Behavior manager 322 can also dynamically adapt individual RC elements while collaborative framework 320 is in various states, including during runtime. For example, after loading an RC element, behavior manager 322 can instantiate or specialize the RC element with an information kernel that has been defined through one or more instructions. Behavior manager 322 can uninstantiate or generalize a specialized RC element by decoupling the existing information kernel from the RC element. Behavior manager 322 can also re-instantiate or re-specialize a specialized RC element by swapping out the existing information kernel with a new information kernel.

As described above, collaborative framework 320 can manage the IC elements associated with collaborative behaviors separately and distinctly from the RC elements and link elements. To satisfy UI requirements for collaborative behaviors, UI manager 324 of collaborative framework 320 can provide a set of IC elements based on available user interaction capabilities. UI manager 324 can launch IC elements as separate processes, similar to the way that behavior manager 322 launches the RC elements, and thus providing similar functionality and benefits as discussed above to UI manager 324 when managing and transitioning between running IC elements. Moreover, the IC elements are launched as separate processes from the RC elements and the link elements. However, UI manager 324 does not define explicit links between running IC elements. Instead, UI manager 324 can utilize the above-described notion of Δ (i.e., the compatibility function) to determine the appropriateness of a IC element for a specific RC element. In various embodiments, the compatibility function associated with a collaborative behavior can specify that certain IC elements are required for that collaborative behavior when loaded by collaborative framework 320, either by the collaborative behavior itself (e.g., in the behavior manifest) or by at least one specific robot capability (e.g., in the launch file) in the collaborative behavior. FIG. 5 depicts an example of a UI 500 populated with tool behavior UI elements 510 provided by IC elements that let the user select and/or apply a tool behavior constraint associated with a sander, and UI 500 is described in greater detail below with respect to an example process.

In various embodiments, collaborative framework 320 can create a collaborative behavior by satisfying, as per compatibility function A, all user interaction requirements of robot capabilities in the collaborative behavior's composition of robot capabilities. After loading each robot capability in the composition as an RC element, collaborative framework 320 can determine user interaction capabilities required by the robot capability based on requirements listed in a launch file for the robot capability. The robot capability's requirements can list one or more explicitly required user interaction capabilities and/or a list of one or more abstract interface requirements. For instance, a tool motion constraint capability can require a specific user interaction capability for Cartesian control with a joystick. The tool motion constraint capability can also provide a list of one or more abstract interface requirements, such as text fields, buttons, and toggles. Collaborative framework 320 can parse the list of abstract interface requirements and determine which user interaction capabilities match the abstract interface requirements. Then, collaborative framework 320 can locate and load the required IC elements and connect each IC element to one or more RC elements that require the IC element or a user interface provided by the IC element.

In response to collaborative framework 320 or any module therein receiving a command to load a collaborative behavior, UI manager 324 can automatically load all IC elements listed as UI requirements in a behavior manifest associated with the collaborative behavior. Additionally, if and when collaborative framework 320 loads one or more needy RC elements that have specific UI requirements beyond those of the collaborative behavior as a whole, the needy RC elements can broadcast their UI requirements over a shared memory space for data (e.g., a ROS parameter server) during the loading process. In response to the broadcast UI requirements, UI manager 324 can load IC elements required by the needy RC elements. Subsequent to loading IC elements required by the collaborative behavior and/or any needy RC element, UI manager 324 can call on the loaded IC element to provide one or more UI elements appropriate for the UI requirements and make any necessary connections. To ensure that the UIs provide the necessary interaction modalities to the user for the collaborative behavior, the collaborative behavior's author or designer must explicitly specify at least a minimal set of UI requirements for the collaborative behavior.

In various embodiments, an example of which is shown in FIG. 3B, the collaborative system can include a distributed collaborative framework 350 having modules running on a group of separate computers (not shown). The group of computers can include multiple general purpose or application-specific computers, examples of which include a client-server network, a peer-to-peer network, a computer cluster, a grid, a cloud, etc., or any combination thereof. The computers can be machines of any type (e.g., physical, virtual, etc.) that are communicatively coupled via at least one network 360, which can include one or more communication networks of any suitable type, such as a local area network, a wide area network, an intranet, the Internet, etc. For example, the group of computers can include separate machines networked over ROS. Each computer in the group can be communicatively coupled (e.g., networked) to at least one other computer in the group. Software installed on the group of computers can include the modules of distributed collaborative framework 350 and multiple instances of one or more operating systems (not shown). The modules of distributed collaborative framework 350 can be supported by and/or built on top of the operating systems, which can be any commercial, open-source, or proprietary operating system or platform, such as ROS or other suitable operating systems.

The modules of distributed collaborative framework 350 can include a behavior manager 352 that manages the RC elements and link elements and one or more instances 354 of UI manager that manage the IC elements. Distributed collaborative framework 350 can use one or more UIs 370 to communicate and interact with one or more users by providing UIs 370 via one or more components or peripherals of the computers and/or one or more components of robots 380. One skilled in the art will recognize that UIs 370 can be provided via other components and peripherals without departing from the spirit and scope of the present disclosure. Distributed collaborative framework 350 can communicate and interact with one or more robots 380 and/or the users via network 360 to learn and/or provide collaborative/assistive functionalities associated with the collaborative behaviors.

With the explicit separation of the RC elements and IC elements in collaborative framework 350, behavior manager 352 and at least one instance of UI manager instances 354 can run on separate computers. Such configuration flexibility can be useful in scenarios where distributed collaborative framework 350 requires one or more power-hungry logical modules to manage the logical components and links but has lightweight UI front ends. To optimize performance in these scenarios, distributed collaborative framework 350 can run behavior manager 352 on a powerful, remote computer or computer cluster (not shown) and run one or more distributed instances of UI manager instances 354 on one or more less-powerful local computers (not shown), such as desktops, laptops, tablets, mobile devices, robot controllers, and the like.

Furthermore, UI manager instances 354 can customize one or more display parameters and other characteristics of elements in UIs 370 based on the type and nature of components or peripherals (e.g., displays) connected to the local computers. For example, UI elements of one of UIs 370 being displayed on a small touchscreen tablet can be more compact with larger buttons tailored for touch interaction. For another example, UI elements of one of UIs 370 being displayed via a virtual reality device can include immersive UI elements. The configuration flexibility of distributed collaborative framework 350, which allows for UI manager instances 354 to be distributed across separate computers and UI elements in UIs 370 to be customized, enables domain-specific interaction where UIs 370 can be automatically configured based on the hardware platforms through which distributed collaborative framework 350 interacts with the users.

Exemplary embodiments of the collaborative system, such as those described herein and illustrated in FIGS. 3A and 3B, are intended to present concepts in a concrete fashion and are described in sufficient detail to enable those skilled in the art to practice these embodiments. However, other embodiments can be utilized and changes can be made without departing from the scope of the present disclosure.

Figure 6:
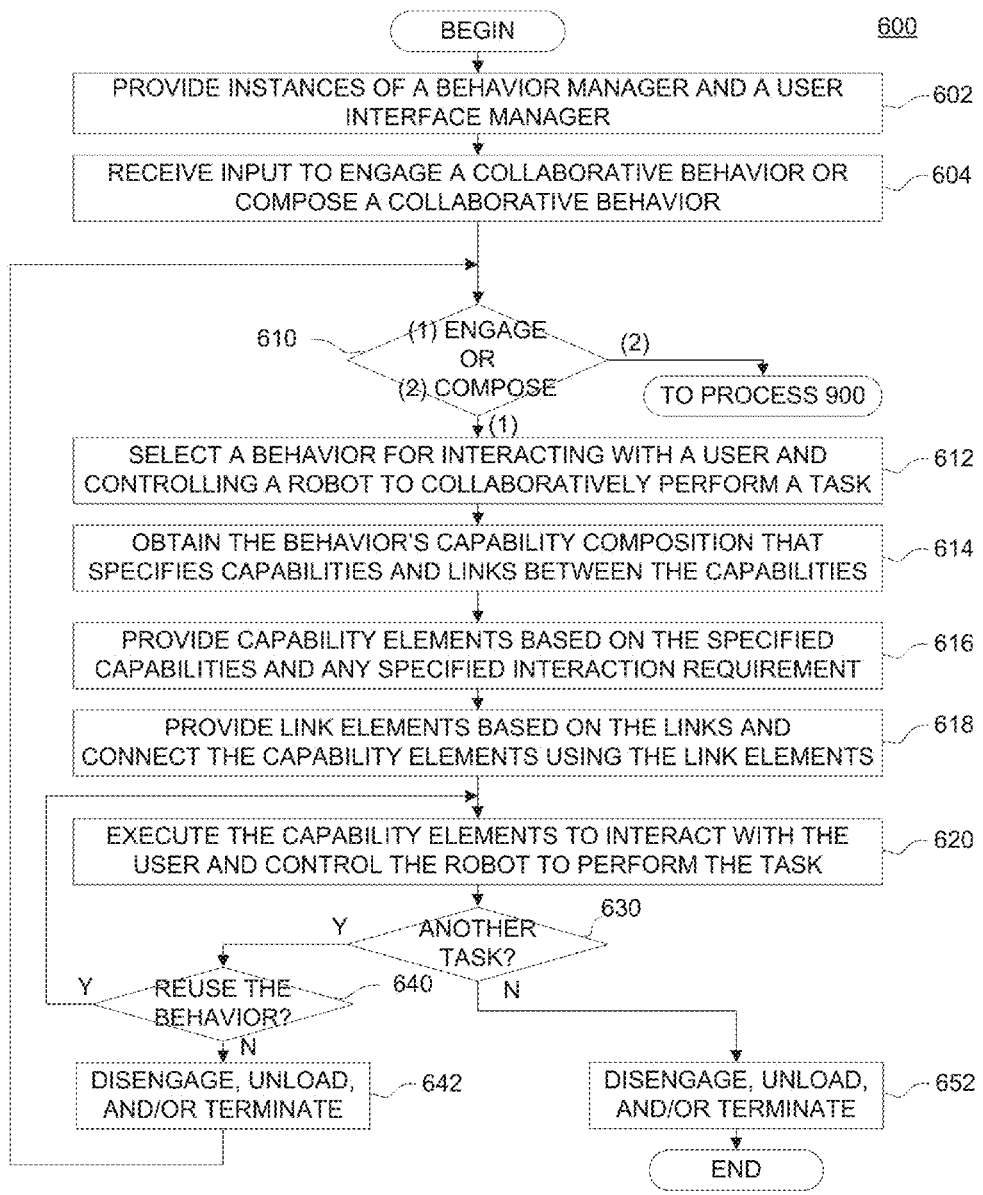
FIG. 6 is a flow diagram illustrating an example method for enabling human-machine collaborations via a generalizable framework that supports dynamic adaptation and reuse of robotic capability representations and human-machine collaborative behaviors, consistent with embodiments of the present disclosure.

FIG. 6 is a flow diagram of a process 600 performed by a generalizable framework that supports the creation, dynamic adaptation, and management of reusable capability representations and the creation, reuse, and management of human-machine collaborative behaviors, according to embodiments of the present disclosure. Process 600 can be performed by a collaborative framework, such as collaborative framework 320 as shown in FIG. 3A or distributed collaborative framework 350 as shown in FIG. 3B. Process 600 can begin by launching or providing the collaborative framework, or process 600 can begin during or after the collaborative framework's launch.

At block 602, the collaborative framework can provide modules, including at least one instance of a behavior manager (e.g., behavior manager 322, 352) and at least one instance of a UI manager (e.g., UI manager 324, 354). Instances of the behavior manager and the UI manager can each be launched and executed as a separate process, and thus can run on different computers or machines. During and/or after initiation, the collaborative framework can instruct the behavior manager and/or the UI manager to build one or more lists of available capabilities and/or collaborative behaviors. The lists can include one or more lists of robot capabilities (e.g., general robot capabilities, specialized robot capabilities, etc.), user interaction capabilities, links, RC elements (i.e., instances of one or more robot capabilities), IC elements (i.e., instances of one or more user interaction capabilities), link elements (i.e., instances of one or more links), information kernels, collaborative behaviors, and the like. The collaborative framework can build the lists of available capabilities or collaborative behaviors by parsing the local file system for any launch file with a prefix associated with the collaborative framework, and can also locate and read any file containing behavior manifests (e.g., behavior manifest 400).

Next, at block 604, the collaborative framework can receive input to engage or compose a collaborative behavior. The collaborative framework can receive a command to create a new collaborative behavior or select an existing collaborative behavior to engage and/or modify via one or more UI elements, via a command shell, programmatically, or the like. If the collaborative framework receives input to engage an existing collaborative behavior, then the collaborative framework can proceed to block 612. Alternatively, at decision block 610, if the collaborative framework receives input to compose a collaborative behavior, such as create a new collaborative behavior or modify an existing collaborative behavior, then the collaborative framework can perform processing 900, which is described in greater detail below with respect to FIG. 9.

At block 612, the collaborative framework can select a collaborative behavior for interacting with at least one user and controlling a robot to collaboratively perform a task. The collaborative framework can dynamically adapt the collaborative behavior's capabilities to control the robot to collaboratively perform, with the user, a specific task or a task in a specific task class. The task can require one or more task actions to complete, and the collaborative framework can engage one or more collaborative behaviors to perform the task actions. If the collaborative behavior is not loaded in a working memory, at block 614 the collaborative framework can obtain and parse a specification (e.g., behavior manifest 400) of the collaborative behavior that specifies the collaborative behavior's composition of capabilities.

Figure 7:
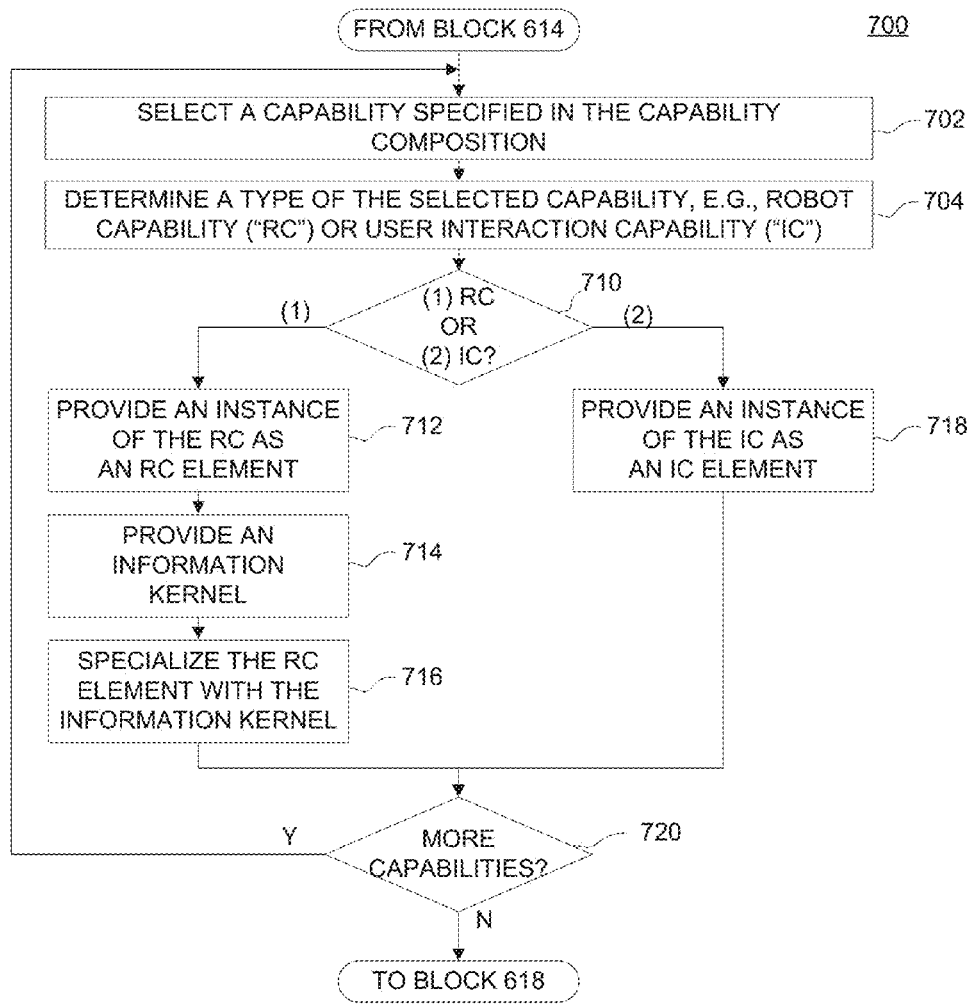
FIGS. 7 and 8 are flow diagrams illustrating example methods for providing various types of capabilities and links for implementing human-machine collaborative behaviors, consistent with embodiments of the present disclosure.
Figure 8:
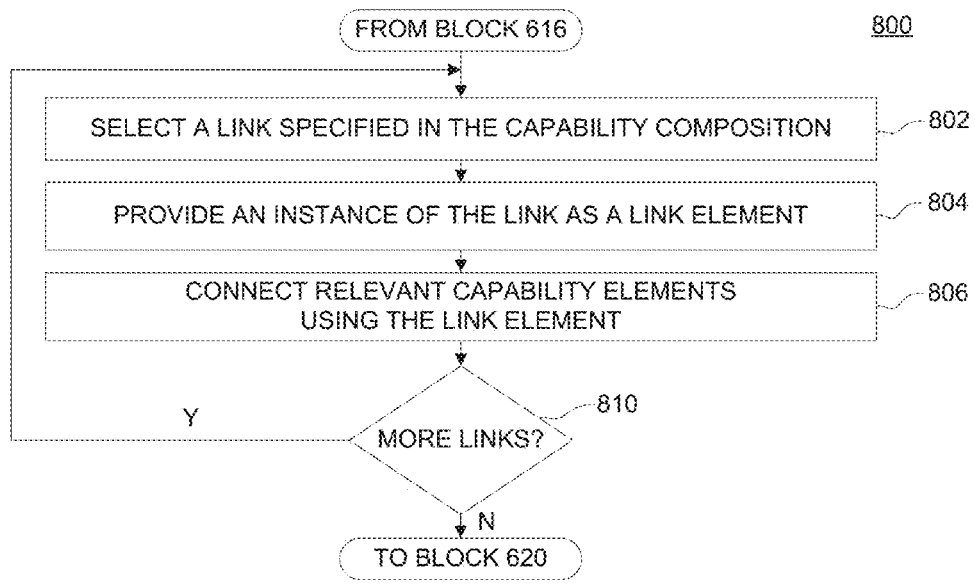

Next, at block 616, the collaborative framework can provide a set of capability elements, which are instances of one or more capabilities, based on the collaborative behavior's capability composition. The set of capability elements includes one or more RC elements and one or more IC elements. In various embodiments, the collaborative framework can provide the set of capability elements by performing processing 700 as shown in FIG. 7 and described in greater detail below. Then, at block 618, the collaborative framework can provide a set of link elements, which are instances of one or more links between the one or more capabilities, and connect the set of capability elements using the set of link elements. In various embodiments, the collaborative framework can provide the set of link elements and connect the set of capability elements by performing processing 800 as shown in FIG. 8 and described in greater detail below.

At block 620, the collaborative framework can engage the collaborative behavior by executing the set of capability elements to interact with the user and control the robot to perform the task. The collaborative framework can instruct the behavior manager to execute the RC elements and use one or more of the RC elements to control one or more functionalities of the robot to perform, with a tool attached to the robot, one or more task actions for completing the task. The collaborative framework can also instruct the UI manager to execute one or more IC elements to provide one or more UIs through which the user can interact with the robot and/or the collaborative framework. The collaborative framework can disengage the engaged collaborative behavior and/or stop running capability elements at any time. For example, the engaged collaborative behavior and/or any of the running RC elements can be disengaged or stopped in response to a command or input from the user to disengage the collaborative behavior or stop any running RC element, the completion of the task or the task actions, an error or safety alarm, and the like. The collaborative framework can also disengage the collaborative behavior when adding or subtracting individual capability elements and/or link elements to make or break links between the capability elements.

Subsequent to completing the task or task actions or disengaging the collaborative behavior, at decision block 630 the collaborative framework can decide whether or not to perform a new task or task action. If the collaborative framework decides to perform a new task, then process 600 can proceed to decision block 640, at which the collaborative framework can decide whether or not to reuse the collaborative behavior and/or one or more capability elements in the set of capability elements. For example, the collaborative framework can determine whether or not the collaborative behavior is suitable for collaboratively performing the new task with the user. If the collaborative framework decides to reuse the collaborative behavior and/or some or all capability elements in the set of capability elements, then the collaborative framework can prepare the collaborative behavior and/or the set of capability elements for transition to the new task prior to process 600 jumping to block 620. For example, based on the requirements of the new task, the collaborative framework can prepare the set of capability elements for transition by generalizing or re-specializing any of the RC elements, re-mapping links between any of the capability elements, and/or terminate and unload any of the capability and link elements.

If at decision block 640 the collaborative framework decides to not reuse the collaborative behavior, then process 600 can proceed to block 642. At block 642, the collaborative framework can disengage and unload the collaborative behavior and/or terminate and unload some or all of the capability and link elements, prior to process 600 jumping to decision block 610 to engage or compose another collaborative behavior to perform the new task. The collaborative framework can unload the collaborative behavior by terminating and unloading the capability and link elements instantiated for the collaborative behavior, etc. However, in case a succeeding collaborative behavior for the new task can utilize one or more of the capability and/or link elements, the collaborative framework can keep some or all of the capability and/or link elements in the working memory, and can re-specialize some or all of the RC elements. On the other hand, if the collaborative framework does not identify any capability or link elements that a succeeding collaborative behavior can reuse, then the collaborative framework can unload the collaborative behavior and terminate and unload all capability and link elements associated with the collaborative behavior before jumping to decision block 610 to engage or compose another collaborative behavior.

Alternatively, if at decision block 630 the collaborative framework decides to not perform another task, then at block 652 the collaborative framework can disengage and unload the collaborative behavior, terminate and unload all capability and link elements associated with the collaborative behavior, terminate and unload the behavior manager and UI manager, and/or terminate and unload the collaborative framework. Finally, subsequent to block 652, process 600 ends.

FIGS. 7 and 8 are flow diagrams of a process 700 and a process 800 performed by the generalizable framework to provide and dynamically adapt reusable capability representations based on human-machine collaborative behaviors, according to embodiments of the present disclosure.

Referring now to FIG. 7, the collaborative framework can perform process 700 while or subsequent to obtaining and parsing the current collaborative behavior's capability composition at block 614 (as shown in FIG. 6). In process 700, the collaborative framework can call the behavior manager to provide RC elements based on one or more robot capabilities specified by the capability composition. The collaborative framework can also call at least one instance of the UI manager to load and run IC elements based on one or more user interaction capabilities specified by the capability composition and/or requested by individual robot capabilities in the capability composition. The collaborative framework can provide each RC element and each IC element as a separate instance or process.

At block 702, the collaborative framework can parse the capability composition and select a capability specified in the capability composition. The collaborative framework can also identify any needy robot capability that has at least one abstract interface requirement not satisfied by the user interaction capabilities specified in the capability composition, and the behavior manager can broadcast the additional UI requirements over a shared memory space. In response, the UI manager can select at least one user interaction capability to satisfy the additional UI requirements. The UI manager can select an appropriate user interaction capability by performing a compatibility function on the needy robot capability. Then, at block 704, the collaborative framework can determine a type of the selected capability, e.g., a robot capability or a user interaction capability.

At decision block 710, if the selected capability is determined to be a robot capability, then process 700 can proceed to block 712, during which the collaborative framework can provide an instance of the robot capability as an RC element. The collaborative framework can provide the RC element based on one or more general robot capabilities that are appropriate for performing the task actions based on one or more task action types associated with the task actions to be performed using the collaborative behavior. For example, the collaborative framework can provide the RC element by instructing the behavior manager to call a launch file associated with the robot capability and create the RC element. Examples of general robot capabilities include motion constraint, motion instant replay, trajectory generation, and the like. If an instance of the robot capability is available and already loaded in memory, for example, to perform a prior task and/or as required by a previously-loaded collaborative behavior, then the collaborative framework can simply adapt the already-loaded RC element instead of creating a new RC element.

Next, at block 714, the collaborative framework can provide at least one information kernel with which to instantiate or specialize the RC element. The information kernel encapsulates a set of one or more task-related parameters required by the RC element, and types of parameter that can be encapsulated in the information kernel include, for example, a tool behavior constraint, a TMP, a perceptual template, and the like. The collaborative framework can identify the information kernel based on the capability composition and/or the set of parameters required by the RC element. Then, at block 716, the collaborative framework can specialize the RC element with the information kernel. If the RC element is already specialized with a different information kernel, then the collaborative framework can re-specialize the RC element, for example, by generalizing the RC element (e.g., decoupling the RC element from the different information kernel) and then specializing the RC element with the information kernel. Subsequent to block 716, process 700 can proceed to decision block 720.

Alternatively, if at decision block 710 the selected capability is determined to be a user interaction capability, then process 700 can proceed to block 718, during which the collaborative framework can provide an instance of the user interaction capability as an IC element. For example, the collaborative framework can provide the IC element by instructing the UI manager to call a launch file associated with the user interaction capability and create the IC element. The UI manager can also determine the characteristics of a user interface (e.g., display, user input device, etc.) through which the IC element will interact with the user, and then customize the IC element based on those characteristics. If an instance of the user interaction capability is available and already loaded in memory, for example, to perform a prior task and/or as required by a previously-loaded collaborative behavior, then the collaborative framework can simply adapt the already-loaded IC element instead of creating a new IC element. Subsequent to block 718, process 700 can proceed to decision block 720.

At decision block 720, the collaborative framework can determine, based on the capability composition and/or abstract interface requirements of any needy robot capability, whether or not to provide more instances of capabilities. If yes, then process 700 can jump to block 702. Alternatively, if no, then the collaborative framework can terminate process 700 and jump to block 618 (as shown in FIG. 6).

Referring now to FIG. 8, the collaborative framework can perform process 800 subsequent to providing the RC elements associated with the robot capabilities specified in the capability composition. In process 800, the collaborative framework can call the behavior manager to provide link elements based on links and mappings specified by the collaborative behavior's capability composition and can provide each link element as a separate instance or process.

At block 802, the collaborative framework can parse the capability composition for one or more links or connections between the capabilities, such as links between the robot capabilities and mappings between robot capabilities and user interaction capabilities. Next, at block 804, the collaborative framework can provide an instance of the link or mapping as a link element. Then, at block 806, the collaborative framework can use the link element to connect the relevant capability elements. For example, a link can be formed between a pair of capability elements based on a link or mapping specified in the capability composition. A linked pair of capability elements includes a publisher capability element and a subscriber capability element. The collaborative framework can form a link between the linked pair in the form of a topic, in which the publishing capability element publishes to the topic and the subscribing capability element subscribes to the topic.

Finally, at decision block 810, the collaborative framework can determine whether or not to provide more link elements based on any remaining links and mappings in the capability composition. If yes, then process 800 can jump to block 802. Alternatively, if no, then the collaborative framework can terminate process 800 and jump to block 620 (as shown in FIG. 6).

Figure 9:
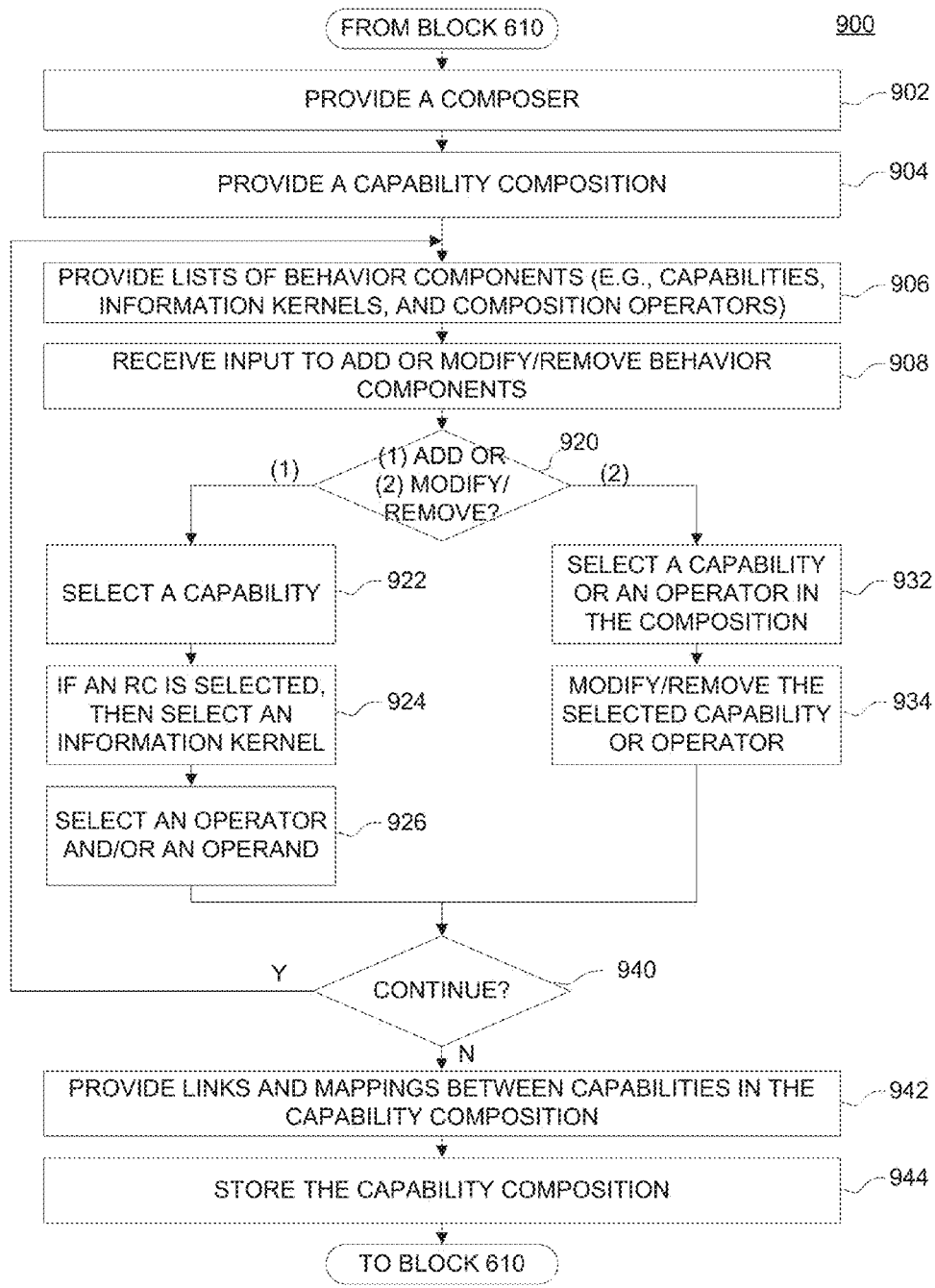
FIG. 9 is a flow diagram illustrating an example method for composing human-machine collaborative behaviors, consistent with embodiments of the present disclosure.

FIG. 9 is a flow diagram illustrating an example method for composing human-machine collaborative behaviors, according to embodiments of the present disclosure. The collaborative framework can perform process 900 subsequent to receiving input to compose a collaborative behavior at block 610 (as shown in FIG. 6). At block 902, the collaborative framework can provide a composer, for example, by instructing the behavior manager and/or the UI manager to provide the composer.

At block 904, the collaborative framework can instruct the composer to provide a capability composition for the collaborative behavior. If the collaborative behavior is new or does not include a capability composition, then the composer can create a capability composition. Alternatively, if the collaborative behavior includes a capability composition, then the composer can load the capability composition. Next, at block 906, the composer can provide lists of behavior components including available robot capabilities, user interaction capabilities, information kernels, composition operators, and the like. The composer can build the lists of available behavior components by parsing the local file system for any configuration files and/or launch files with a prefix associated with the collaborative framework.

At block 908, the composer can receive input from the user to add, modify, or remove behavior components in the capability composition, for example, via one or more UI elements or a command shell, programmatically, or the like. Then, at decision block 920, the composer can determine whether to add or modify/remove one or more behavior components.

If at decision block 920 the composer determines that the user wants to add one or more behavior components to the capability composition, then process 900 can proceed to block 922, at which the composer can select a capability. The composer can select a capability in response to the user's selection from the list of capabilities, command line, and the like. Next, at block 924, the composer can determine whether or not the selected capability is a robot capability. If yes, then the composer can prompt the user to select an information kernel with which to instantiate or specialize the robot capability. Then, at block 926, the composer can select a composition operator associated with the selected capability and/or an operand (e.g., another capability) with which to composite the selected capability. The composer can add the selected capability and optionally the selected operator and/or operand in the capability composition. Subsequent to block 926, process 900 can proceed to decision block 940.

Alternatively, if at decision block 920 the composer determines that the user wants to modify or remove one or more behavior components from the capability composition, then process 900 can proceed to block 932, at which the composer can provide the capability composition to the user and receive user input to select at least one behavior component in the capability composition. Then, at block 934, the composer can modify the selected behavior component or remove the selected behavior component from the capability composition. Subsequent to block 934, process 900 can proceed to decision block 940.

At decision block 940, the composer can determine whether or not to continue composing the capability composition. The composer can make that determination based on user input. The composer can also determine whether or not all user interaction requirements of robot capabilities in the capability composition are satisfied, as per compatibility function, by the user interaction capabilities in the capability composition. If the composer decides to continue, then process 900 can jump to block 906. Alternatively, if the composer decides to not continue, then process 900 can proceed to block 942.

At block 942, the composer can provide one or more links and mappings between the capabilities in the capability composition. The composer can parse the capability composition and provide or derive the links and mappings based on one or more composition operators in the capability composition, abstract interface requirements of the robot capabilities, user input, and the like. Finally, at block 944, the composer can store the capability composition in a behavior manifest associated with the collaborative behavior. The behavior manifest, an example of which is shown in FIG. 4, can encapsulate one or more robot capabilities, user interaction capabilities, and links/mappings for the collaborative behavior into tags, under which capabilities and links/mappings required for the collaborative behavior are listed. Finally, subsequent to block 944, the collaborative framework can terminate process 900 and jump to block 610 (as shown in FIG. 6).

Example Process

The collaborative framework can create or load a collaborative behavior to collaboratively perform a sanding task with the user. After creating or loading the collaborative behavior and loading at least one general robot capabilities specified in the collaborative behavior, the collaborative framework can identify that a sander is attached to the robot and instantiate the general robot capability with at least one information kernel that encapsulates parameters associated with a sander. The collaborative framework can then load a tool behavior interaction capability based on a UI requirement of the instantiated robot capability, and provide a tool behavior UI element that lets the user select and/or apply a tool behavior constraint associated with the sander, if not already loaded. For example, the tool behavior interaction capability may not be a capability required by the collaborative behavior. The collaborative framework can then run the tool behavior interaction capability to provide tool behavior UI elements 510 (as shown in FIG. 5) that allows the user to select and enforce one or more behavior constraints specified in the tool behavior constraint, and then constrain the robot's motion based on the enforced behavior constraints. For example, the collaborative framework can enforce or apply a behavior constraint to constrain the motion of the attached sander to only within the plane of its sanding pad.

The collaborative framework can similarly identify and load, if necessary, a workpiece interaction capability that lets the user select and/or apply a perceptual template, and then run the workpiece interaction capability to provide at one or more workpiece UI elements 520, which can include a 3-D rendering of detected planes of a workpiece and an input point cloud for the user to select one or more target locations on the workpiece. Workpiece UI elements 520 can further allow the user to toggle a "snap to selected surface" perceptual template for teleoperation, which can constrain the orientation of the attached sander to the normal of the selected plane or surface. The collaborative framework can incorporate workpiece UI elements 520 that lets the user select the tool behavior and perceptual templates into a larger tool-constrained teleoperation behavior, which the collaborative framework can enforce while the user admittance-guides the robot.

The collaborative framework can provide a TMP recording element 530 that record or learn one or more user-demonstrated motions associated with a TMP required by the collaborative behavior to perform the sanding task. The collaborative framework can also create a TMP implementation UI element (not shown) for selecting points on the workpiece's plane or surface to instantiate a saved TMP at the selected points. After receiving user selection of the desired workpiece plane in the 3-D view, which specifies a planar perceptual template, the collaborative framework can warp the current 2-D color image to show an orthogonal top-down view of the planar region. The user can then select a set of points in the image and the robot can engage the collaborative behavior to autonomously execute the motion encapsulated in the TMP at each of the points for a number of times specified via UI elements 540. This can be used in a larger behavior called TMP implementation.

Figure 10:
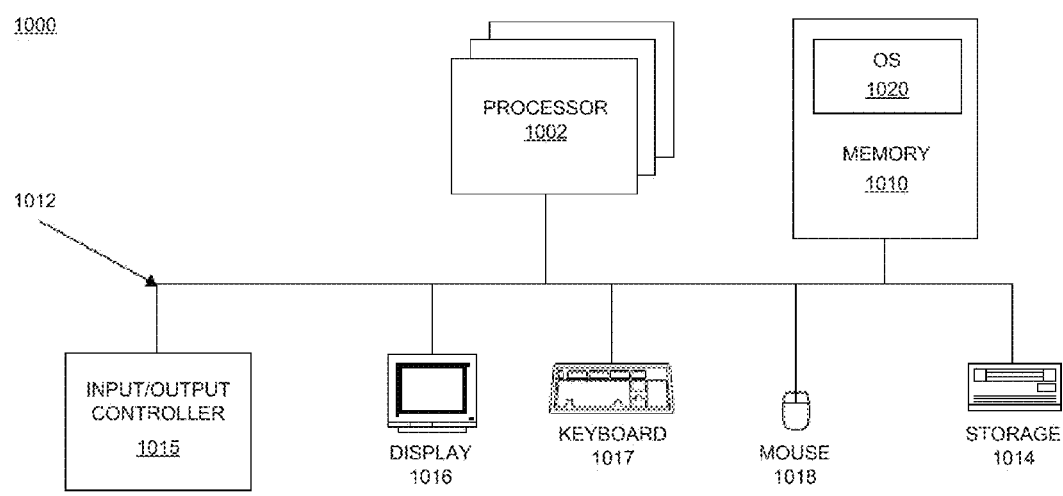
FIG. 10 is an example computer system for performing the disclosed embodiments, consistent with the present disclosure.

FIG. 10 illustrates a computer system 1000 that is consistent with embodiments of the present disclosure. In general, embodiments of a human-machine collaborative system (e.g., collaborative framework 320 and distributed collaborative framework 350) may be implemented in various computer systems, such as one or more personal computers, servers, workstations, embedded systems, multifunction devices, or a combination thereof. Certain embodiments of the collaborative system or modules therein may be embedded as a computer program. The computer program may exist in a variety of forms both active and inactive. For example, the computer program can exist as software program(s) comprised of program instructions in source code, object code, executable code or other formats; firmware program(s); or hardware description language ("HDL") files. Any of the above can be embodied on a computer readable medium, which include storage devices and signals, in compressed or uncompressed form. However, for purposes of explanation, system 1000 is shown as a general purpose computer that is well known to those skilled in the art. Examples of the components and peripherals that may be included in system 1000 will now be described.

As shown, system 1000 may include at least one processor 1002, a keyboard 1017, a pointing device 1018 (e.g., a mouse, a 3-D pointing device, a touchpad, and the like), a display 1016, main memory 1010, an input/output controller 1015, and a storage device 1014. Storage device 1014 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 1014. System 1000 may also be provided with additional input/output devices, such as a printer (not shown). The various components of system 1000 communicate through a system bus 1012 or similar architecture. In addition, system 1000 may include an operating system ("OS") 1020 that resides in memory 1010 during operation. One skilled in the art will recognize that system 1000 may include multiple processors 1002. For example, system 1000 may include multiple copies of the same processor. Alternatively, system 1000 may include a heterogeneous mix of various types of processors. For example, system 1000 may use one processor as a primary processor and other processors as co-processors. For another example, system 1000 may include one or more multi-core processors and one or more single core processors. Thus, system 1000 may include any number of execution cores across a set of processors (e.g., processor 1002). As to keyboard 1017, pointing device 1018, and display 1016, these components may be implemented using components that are well known to those skilled in the art. One skilled in the art will also recognize that other components and peripherals may be included in system 1000.

Main memory 1010 serves as a primary storage area of system 1000 and holds data that is actively used by applications, such as the printer driver in the barcode printing system, running on processor 1002. One skilled in the art will recognize that applications are software programs that each contains a set of computer instructions for instructing system 1000 to perform a set of specific tasks during runtime, and that the term "applications" may be used interchangeably with application software, application programs, device drivers, and/or programs in accordance with embodiments of the present teachings. Memory 1010 may be implemented as a random access memory or other forms of memory as described below, which are well known to those skilled in the art.

OS 1020 is an integrated collection of routines and instructions that are responsible for the direct control and management of hardware in system 1000 and system operations. Additionally, OS 1020 provides a foundation upon which to run application software and device drivers. For example, OS 1020 may perform services, such as resource allocation, scheduling, input/output control, and memory management. OS 1020 may be predominantly software, but may also contain partial or complete hardware implementations and firmware. Well known examples of operating systems that are consistent with the principles of the present teachings include ROBOT OPERATING SYSTEM, LINUX, UNIX, ORACLE SOLARIS, MICROSOFT WINDOWS, MAC OS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 1002), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. A computer-implemented method for enabling generalizable user-robot collaboration, comprising:
   providing a composition of a robot capability and one or more user interaction capabilities, wherein the robot capability models at least one functionality of a robot for performing a type of task action;

specializing the robot capability with an information kernel to provide a specialized robot capability, wherein the information kernel encapsulates a set of task-related parameters associated with the type of task action;

providing an instance of the specialized robot capability as a robot capability element that controls the at least one functionality of the robot based on the set of task-related parameters;

providing one or more instances of the one or more user interaction capabilities as one or more interaction capability elements;

executing the robot capability element to receive user input via the one or more user interaction capability elements; and controlling, based on the user input and the set of task-related parameters, the at least one functionality of the robot to perform at least one task action of the type of task action in collaboration with the user input.

2. The method of claim 1, further comprising:
providing, via the one or more interaction capability elements, one or more user interfaces (UIs); and
receiving the user input via the one or more UIs.

3. The method of claim 1, wherein the one or more user interaction capabilities include an admittance control interaction capability, the method further comprising:
providing an instance of the admittance control interaction capability as an admittance control interaction capability element; and
receiving, via the admittance control interaction capability element, user manipulation of the robot as the user input.

4. The method of claim 3, further comprising:
providing, based on the admittance control interaction capability element, an admittance control instructor interface that receives the user manipulation of the robot as a user demonstrated motion;
determining a start pose of the robot;
acquiring trajectory data of the user demonstrated motion;
generalizing the trajectory data based on the start pose of the robot to form a tool movement primitive (TMP); and
storing the TMP.

5. The method of claim 1, wherein the type of task action includes motion constraint and the set of task-related parameters in the information kernel includes a set of tool parameters associated with a type of tool, and wherein executing the robot capability element further comprises:
detecting that a tool of the type of tool is attached to the robot; and
constraining, based on the set of tool parameters associated with the type of tool, one or more motions of the robot in performing the at least one task action responsive to the user input, thereby enforcing the motion constraint.

6. The method of claim 5, wherein constraining the one or more motions of the robot further comprises:
obtaining a start pose of the robot; and
constraining, based on the start pose of the robot and the set of tool parameters associated with the type of tool, the one or more motions of the robot.

7. The method of claim 5, wherein the set of tool parameters includes a tool geometry and a tool behavior constraint, the method further comprising:

generating, based on the tool geometry and the tool behavior constraint, a tool-constrained workspace of the robot that is a subset of a maximum workspace of the robot; and
constraining the one or more motions of the robot, thereby constraining the robot to the tool-constrained workspace.

8. The method of claim 5, wherein the set of task-related parameters in the information kernel includes a perceptual template, and wherein constraining the one or more motions of the robot further comprises:
obtaining a set of workpiece characteristics of at least one target workpiece; and
constraining, based on the initial pose of the robot and the set of workpiece characteristics, the one or more motions of the robot.

9. The method of claim 1, wherein the type of task action includes motion instant replay and the set of task-related parameters in the information kernel includes a TMP, and wherein executing the robot capability element further comprises:
determining, via the one or more user interaction capabilities, a start pose of the robot; and
controlling, based on the start pose of the robot and a tool motion trajectory of the TMP, one or more motions of the robot in performing the at least one task action.

10. The method of claim 9, wherein the set of task-related parameters in the information kernel includes a perceptual template, and wherein controlling the one or more motions of the robot further comprises:
obtaining a set of workpiece characteristics of at least one workpiece in a workspace of the robot; and
grounding, based on the set of workpiece characteristics, the one or more motions of the robot in performing the at least one task action.

11. The method of claim 1, wherein the composition of the robot capability and the one or more user interaction capabilities includes one or more links between the robot capability and the one or more user interaction capabilities, the method further comprising:
providing one or more instances of the one or more links as one or more link elements that connect the robot capability element to the one or more user interaction capability elements.

12. The method of claim 11, wherein providing the one or more instances of the one or more links further comprises:
deriving an UI requirement of the robot capability element based on an interface of the robot capability element, wherein the interface includes at least one of an input interface or an output interface; and
providing, based on the UI requirement, at least one instance of at least one link as at least one link element that connect the robot element to the at least one user interaction capability element.

13. The method of claim 1, wherein executing the robot capability element further comprises:
performing a runtime evaluation of the set of task-related parameters in the information kernel during runtime; and
performing, based on the runtime evaluation of the set of task-related parameters, the at least one task action in collaboration with the user input.

14. The method of claim 1, further comprising:
providing a collaborative behavior that includes the composition of the robot capability and the one or more user interaction capabilities;

selecting a plurality of robot capabilities based on a robot capability composition requirement of the collaborative behavior;

composing the plurality of robot capabilities into a composition of robot capabilities as the robot capability; and associating the composition of robot capabilities with the collaborative behavior.

15. The method of claim 14, wherein composing the plurality of robot capabilities further comprises:

composing two robot capabilities of the plurality of robot capabilities using at least one of a parallel composition operator or a serial composition operator.

16. The method of claim 14, further comprising:

deriving a plurality of UI requirements of the composition of robot capabilities by performing a compatibility function on the composition of robot capabilities; and determining at least one user interaction capability that meets the plurality of UI requirements; and generating a mapping between the composition of robot capabilities and the at least one user interaction capability based on the plurality of UI requirements.

17. The method of claim 14, further comprising:

providing a plurality of robot capability elements, wherein the plurality of robot capability elements are instances of the plurality of robot capabilities;

providing a plurality of user interaction capability elements, wherein the plurality of user interaction capability elements are instances of the one or more user interaction capabilities and the at least one user interaction capability; and forming a link between a pair of robot capability elements of the plurality of robot capability elements based on a link requirement of the collaborative behavior, wherein the pair of robot capability elements include a publisher robot capability element and a subscriber robot capability element.

18. The method of claim 17, further comprising:

providing each of the plurality of robot capability elements, the plurality of interaction capability elements, and the link in a separate process.

19. A system for enabling generalizable user-robot collaboration, comprising:

a non-transitory memory storing instructions; and a processor executing the instructions to cause the system to perform a method comprising:

providing a composition of a robot capability and one or more user interaction capabilities, wherein the robot capability models at least one functionality of a robot for performing a type of task action;

specializing the robot capability with an information kernel to provide a specialized robot capability, wherein the information kernel encapsulates a set of task-related parameters associated with the type of task action;

providing an instance of the specialized robot capability as a robot capability element that controls the at least one functionality of the robot based on the set of task-related parameters;

providing one or more instances of the one or more user interaction capabilities as one or more interaction capability elements;

executing the robot capability element to receive user input via the one or more user interaction capability elements; and controlling, based on the user input and the set of task-related parameters, the at least one functionality of the robot to perform at least one task action of the type of task action in collaboration with the user input.

20. A non-transitory computer-readable storage medium containing instructions which, when executed on a processor, perform a method comprising:

providing a composition of a robot capability and one or more user interaction capabilities, wherein the robot capability models at least one functionality of a robot for performing a type of task action;

specializing the robot capability with an information kernel to provide a specialized robot capability, wherein the information kernel encapsulates a set of task-related parameters associated with the type of task action;

providing an instance of the specialized robot capability as a robot capability element that controls the at least one functionality of the robot based on the set of task-related parameters;

providing one or more instances of the one or more user interaction capabilities as one or more interaction capability elements;

executing the robot capability element to receive user input via the one or more user interaction capability elements; and controlling, based on the user input and the set of task-related parameters, the at least one functionality of the robot to perform at least one task action of the type of task action in collaboration with the user input.

* * * * *